(12) United States Patent
Chen et al.

(10) Patent No.: US 9,772,953 B2
(45) Date of Patent: Sep. 26, 2017

(54) METHODS AND APPARATUS FOR PROTECTING OPERATING SYSTEM DATA

(71) Applicant: Samsung Electronics Co., Ltd., Suwon-si, Gyeonggi-do (KR)

(72) Inventors: Quan Chen, Raleigh, NC (US); Ahmed Azab, San Jose, CA (US); Peng Ning, Cupertino, CA (US); Guruprasad Ganesh, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 14/610,423

(22) Filed: Jan. 30, 2015

(65) Prior Publication Data

US 2015/0220455 A1    Aug. 6, 2015

Related U.S. Application Data

(60) Provisional application No. 61/935,097, filed on Feb. 3, 2014.

(51) Int. Cl.
| | | |
|---|---|---|
| *G06F 12/14* | (2006.01) | |
| *G06F 21/53* | (2013.01) | |
| *G06F 21/62* | (2013.01) | |
| *G06F 21/64* | (2013.01) | |

(52) U.S. Cl.
CPC ...... *G06F 12/1408* (2013.01); *G06F 12/1466* (2013.01); *G06F 12/1483* (2013.01); *G06F 21/53* (2013.01); *G06F 21/6281* (2013.01); *G06F 21/64* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 7,401,358 B1 | 7/2008 | Christie et al. | |
| 8,856,473 B2* | 10/2014 | van Riel | G06F 21/53 711/163 |
| 2008/0162784 A1* | 7/2008 | Obereiner | G06F 21/53 711/103 |
| 2009/0121028 A1* | 5/2009 | Asnaashari | G06F 12/1425 235/492 |
| 2010/0031360 A1* | 2/2010 | Seshadri | G06F 21/57 726/24 |

(Continued)

FOREIGN PATENT DOCUMENTS

| | | |
|---|---|---|
| WO | 2008/091462 A1 | 7/2008 |
| WO | 2013/055499 A1 | 4/2013 |

OTHER PUBLICATIONS

European Search Report dated Aug. 21, 2017 issued in the European Application No. 15742719.6.

*Primary Examiner* — Yaima Rigol
(74) *Attorney, Agent, or Firm* — Jefferson IP Law, LLP

(57) ABSTRACT

An apparatus and method for protecting kernel data integrity in an electronic device are provided. The method includes mapping a specified type of data to a read-only memory area, detecting a write attempt to the specified type of data, determining whether a process attempting to write to the specified type of data is permitted according to a specified condition, and allowing the write attempt if the process attempting to write to the specified type of data satisfies the specified condition.

28 Claims, 11 Drawing Sheets

(56) References Cited

U.S. PATENT DOCUMENTS

| | | |
|---|---|---|
| 2010/0043072 A1 | 2/2010 | Rothwell |
| 2010/0058041 A1* | 3/2010 | John .................. G06F 12/1408 |
| | | 713/2 |
| 2010/0153671 A1 | 6/2010 | Safa |
| 2010/0153672 A1* | 6/2010 | Jogand-Coulomb G06F 13/4243 |
| | | 711/164 |
| 2011/0209219 A1 | 8/2011 | Zeitlin et al. |
| 2011/0314284 A1* | 12/2011 | Chou .................. H04L 63/0428 |
| | | 713/169 |
| 2012/0203997 A1* | 8/2012 | Block .................... G01C 23/00 |
| | | 711/170 |
| 2012/0255016 A1 | 10/2012 | Sallam |
| 2013/0132690 A1* | 5/2013 | Epstein ................ G06F 12/145 |
| | | 711/159 |
| 2013/0232345 A1 | 9/2013 | Johnson et al. |
| 2014/0181504 A1* | 6/2014 | Almahallawy ..... H04L 63/0823 |
| | | 713/156 |

\* cited by examiner

```
.text : {               /* Real text segment      */
    _stext = .;         /* Text and read-only data */
        __exception_text_start = .;
        *(.exception.text)
        __exception_text_end = .;           301
        IRQENTRY_TEXT
        TEXT_TEXT
}
    305

/* Creating a new section to store task credentials */
. = ALIGN(1<<PAGE_SHIFT);
.ro: {
    __ro_start = .;         307
    . = __ro_start + 0x400000;
    __ro_end = .;
}
. = ALIGN(1<<PAGE_SHIFT);
```

FIG. 3A

```
vmlinux:  file format elf32-littlearm

Sections:
Idx Name      Size     VMA      LMA      File off  Algn
0 .head.text  00000178 c0008000 c0008000 00008000  2**2
        CONTENTS, ALLOC, LOAD, READONLY, CODE
1 .text       00aa2ce4 c0100000 c0100000 00010000  2**6
        CONTENTS, ALLOC, LOAD, READONLY, CODE
2 .rodata    005af242 c0c00000 c0c00000 00ab8000  2**6
        CONTENTS, ALLOC, LOAD, READONLY, DATA
  .
  .
  .
28 ro        003fff80 c1600080 c1600080 01330080  2**0      311
        ALLOC, LOAD, READONLY,
```

FIG. 3B

```
static inline int is_ro_addr(unsigned long addr) {
    return (addr >= ((unsigned long) __ro_start)          ← 321
        && addr < ((unsigned long) __ro_end));             ← 323
}
```

FIG. 3C

```
c03787fc <is_ro_addr>:    ← 331

.
.
c0378808:    e59fc0ec    ldr    ip, [pc, #236] ; c03788fc <is_ro_addr+0x100>    ← 333
c037880c:    e3c4203f    bic    r2, r4, #63 ; 0x3f
c0378810:    e592000c    ldr    r0, [r2, #12]
c0378814:    e5903354    ldr    r3, [r0, #852] ; 0x354
c0378818:    e153000c    cmp    r3, ip                                         ← 335  337
c037881c:    3a000015    bcc    c0378878 <is_ro_addr+0x7c>
c0378820:    e59f10d8    ldr    r1, [pc, #216] ; c0378900 <is_ro_addr+0x104>
c0378824:    e1530001    cmp    r3, r1
c0378828:    2a000012    bcs    c0378878 <is_ro_addr+0x7c>    ← 339

.   ← 341
.
.

c03788f8: e8bd8030         pop {r4, r5, pc}
c03788fc: c1600000         .word 0xc1600000    ← 343
c0378900: c1a00000         .word 0xc1a00000
```

FIG. 3D

METHODS AND APPARATUS FOR PROTECTING OPERATING SYSTEM DATA

CROSS-REFERENCE TO RELATED APPLICATION(S)

This application claims the benefit under 35 U.S.C. §119 (e) of a U.S. Provisional application filed on Feb. 3, 2014 in the U.S. Patent and Trademark Office and assigned Ser. No. 61/935,097, the entire disclosure of which is hereby incorporated by reference.

TECHNICAL FIELD

The present disclosure relates to an apparatus, system, and method for data protection. More particularly, the present disclosure relates to an apparatus, system, and method for protecting Operating System (OS)-level data structures.

BACKGROUND

In computer systems such as operating systems (OSs), status information may be stored in data structures such as OS-level or kernel-level data structures. For example, the Process Control Block (PCB) may store information about processes currently being executed on the system. As another example, the per-CPU run queues may provide an indication to the OS as to which processes are to be executed next. As another example, the information that defines the credentials, such as the user ID and privilege level, of each process running inside the operating system is defined by a special data structure.

In computer systems, the integrity of these data structures is critical to the system security. For example, an intruder can hide the existence of a malicious process by removing its information from the list of existing running processes. As another example, if an intruder succeeds in maliciously modifying any of the data structures that define these credentials, they can escalate the privilege of their own user processes which can cause damage to the system. The damage may include, but is not limited to, accessing the data of other users or taking full control of the system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for protecting kernel data integrity in an electronic device.

In accordance with an aspect of the present disclosure, a method for protecting kernel data integrity in an electronic device is provided. The method includes mapping a specified type of data to a read-only memory area, detecting a write attempt to the specified type of data, determining whether a process attempting to write to the specified type of data is permitted according to a specified condition, and allowing the write attempt if the process attempting to write to the specified type of data satisfies the specified condition.

In accordance with another aspect of the present disclosure, an apparatus for protecting kernel data integrity in an electronic device is provided. The apparatus includes a storage unit including a read-only memory area, and at least one process configured to map a specified type of data to a read-only memory area, detect a write attempt to the specified type of data, to determine whether a process attempting to write to the specified type of data is permitted according to a specified condition, and to allow the write attempt if the process attempting to write to the specified type of data satisfies the specified condition.

In accordance with another aspect of the present disclosure, a method for protecting kernel data integrity in an electronic device is provided. The method includes generating a cryptography signature, detecting a write attempt to a specified type of data, determining whether a process attempting to write to the specified type of data is permitted according to a specified condition, and confirming that a cryptography signature associated with the write attempt is correct in relation to the generated cryptographic signature.

In accordance with another aspect of the present disclosure, an apparatus for protecting kernel data integrity in an electronic device is provided. The apparatus includes a storage unit including a read-only memory area, and at least one process configured to generate a cryptography signature, to detect a write attempt to a specified type of data, to determine whether a process attempting to write to the specified type of data is permitted according to a specified condition, and to confirm that a cryptography signature associated with the write attempt is correct in relation to the generated cryptographic signature.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which:

FIGS. 3A-3D illustrate an example of securely checking for the validity of protected data from the OS kernel without relying on non-protected data memory allocation for OS kernel data according to various embodiments of the present disclosure;

Throughout the drawings, it should be noted that like reference numbers are used to depict the same or similar elements, features, and structures.

DETAIL DESCRIPTION

Figure 1:
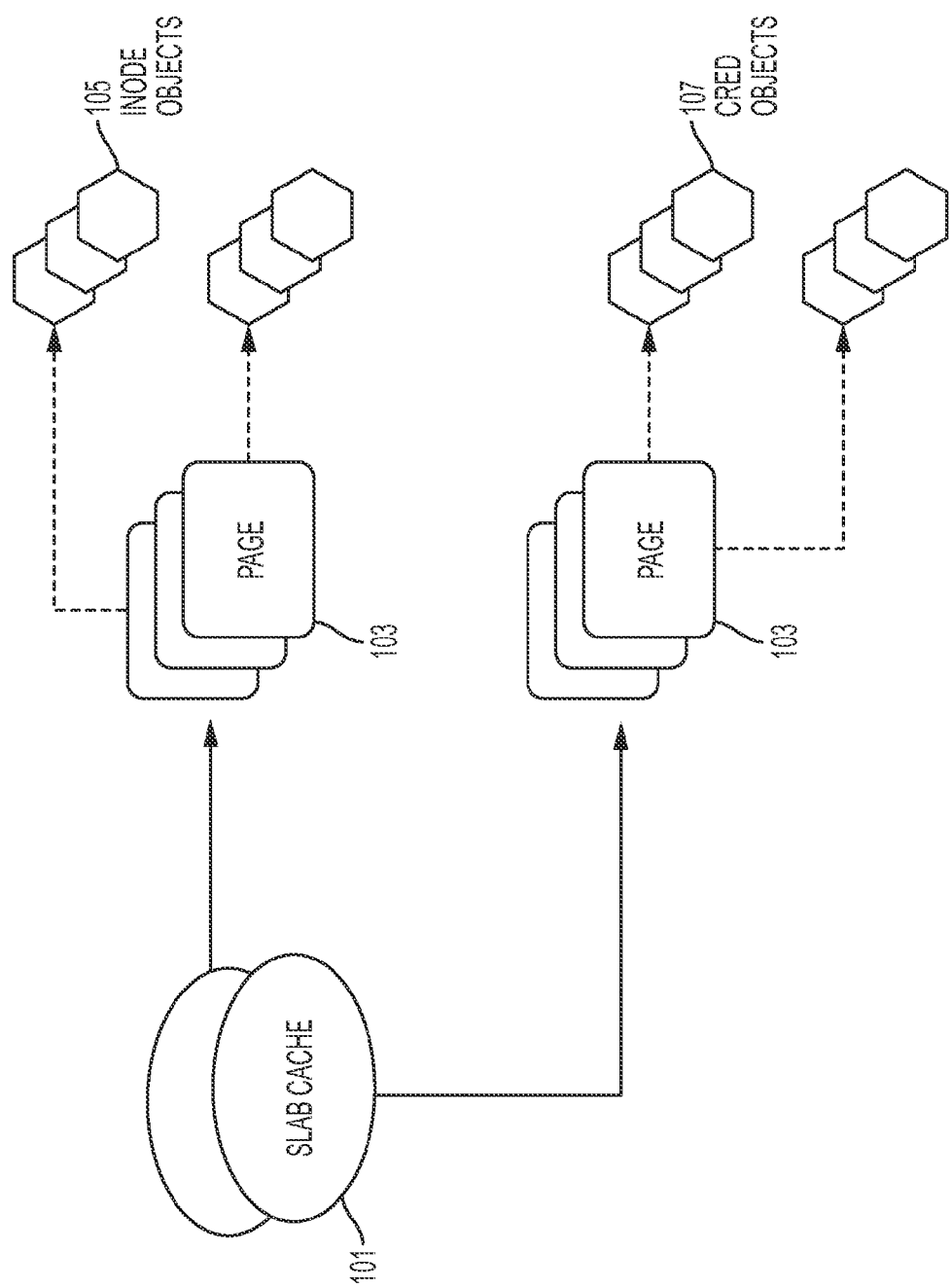
FIG. 1 illustrates a memory allocation for Operating System (OS) kernel data according an embodiment of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The security of an electronic device may be correlated to the security of an Operating System (OS), which relies on two basic factors; the OS code and the OS data. It is relatively easier to protect the OS code than to protect the OS data. For one reason, the OS code is not likely to change during the runtime of the electronic device. On the other hand, the OS data is constantly changing to accommodate the dynamic changes in the system status thus making it more difficult to protect.

Threat of Unauthorized Access to Kernel Data

In one threat, the security of the OS, or OS kernel data, can be threatened if a user process, which could be potentially malicious or controlled by an attacker, obtains unauthorized access to the OS kernel data. Unauthorized access may be obtained if the attacker exploits vulnerability in the OS, or OS kernel. Such exploitation may allow the attacker to subvert the OS policies and security enforcement modules, which would otherwise prevent such unauthorized access.

To counter this threat, the security of an OS may be confirmed by incorporating techniques that enforce existing protection in the OS kernel to prevent potentially malicious user processes from obtaining unauthorized access to the OS kernel data even if they exploit vulnerability in the OS kernel code.

Threat of Maliciously Modifying Kernel Data Through an OS Kernel Vulnerability

In another threat, the security of the OS kernel data can be threatened if a user process, which could be potentially malicious or controlled by an attacker, tricks the OS kernel to bypass its own policies and security enforcement modules to modify its own data in a way that will make the system behave maliciously or in a manner different than the way it is designed or intended to.

In a typical scenario, the security of an OS may also be confirmed by incorporating robust techniques to verify the integrity of kernel data structures. For example, a hard-to-circumvent technique inspects runtime modifications to critical OS kernel data and detects whether these modifications are legitimate or not. If the kernel data monitoring technique cannot detect or categorize the data modification as "legitimate" this may be indicative of an attack, such as a rootkit infection. In such a method, the OS itself is the sole point of evaluation that decides whether the data modification is legitimate or not.

The security of the OS or the OS kernel can be also undermined by vulnerabilities in its own code base. Once vulnerability is exploited by an attacker, it could allow the attacker to avoid the inspection done by the OS kernel to detect whither a data modification is legitimate or not. In other words, OS vulnerability can undermine data integrity verification techniques that are implemented within the OS kernel itself.

Protecting Kernel Security Using a Security Enforcing Agent

To prevent attackers from exploiting OS vulnerabilities and compromising the OS or OS kernel, several techniques, which are out-of-the scope of this application but are assumed to be pre-existing on a system that implements any of the following described embodiments, are proposed to improve the security of an electronic device by partitioning elements of the electronic device into secure partitions and non-secure partitions. The secure partition usually has two main features that guarantee its security. First, it has very limited interface with a potential attacker because, unlike the OS and OS kernel, it does not control any of the system interfaces. Second, it usually resides in secure execution environments that are protected by the host hardware platform. One example is the ARM TrustZone secure execution environment.

In various proposed implementations, which are out-of-the scope of this application but are assumed to be pre-existing on a system that implements any of the following described embodiments, the secure partition may include a Security Enforcement Agent (SEA) that is responsible for protecting the OS kernel from malicious attacks. The SEA may be a module for enforcing security policies on the electronic device. For example, the SEA may enforce policies for running an OS on the electronic device. The SEA may be configured to have the power (e.g., capability, authorization, and/or the like) to monitor the OS kernel, page tables, and/or the like. The SEA may be included in the OS kernel, or may be implemented using hardware. According to various embodiments of the present disclosure, the SEA may be configured to protect and/or measure security of the electronic device (e.g., the computing system thereof and/or the like). The SEA may be configured to protect the integrity of the page tables used by the OS kernel.

The present disclosure may refer to pages, page frames, page tables, or translation tables in describing the various embodiments. For example, a page table or the like may document a mapping of a virtual memory to a physical memory and the access permissions allowed by this mapping. However, various embodiments of the present disclosure are not limited thereto, and other types of methods or schemes for mapping physical memory to virtual memory space may be used.

According to various techniques, which are out-of-the scope of this application but are assumed to be pre-existing on a system that implements any of the following described embodiments, the SEA may protect page tables used by the OS kernel. For example, according to various embodiments of the present disclosure, the SEA may use page table protection to ensure the integrity of the OS kernel code (e.g., to prevent malicious attacks to the OS kernel code). The SEA may make, for example, the virtual memory range associated with the page table for the OS kernel code a read only memory range. As a result, an attacker may not successfully modify the OS kernel code image in the memory without being detected and/or prevented (e.g., by the SEA).

According to various techniques, which are out-of-the scope of this application but are assumed to be pre-existing on a system that implements any of the following described embodiments, the initial integrity of the OS kernel code may be ensured by a mechanism such as Trusted Boot when, for example, the OS kernel initially gets control from the previous-stage bootloader. According to various embodiments of the present disclosure, the SEA may leverage protected execution modes provided by hardware (e.g., virtualization, Trusted Platform module (TPM), ARM TrustZone, and/or the like). According to various embodiments of the present disclosure, the SEA may be implemented without any hardware guarantee.

According to various techniques, it is easy to verify the integrity of the OS or OS kernel code base, which can also be referred to as the OS or OS kernel image, using the methods and techniques proposed above. Nevertheless, there is a need for a practical and efficient technique that can verify the integrity of the kernel data from within the SEA. Benefits of such a technique include the ability to verify data that are critical to security and need to be verified, and, unlike verifications done from the kernel, verifications from within the SEA are not subject to the various vulnerabilities and attacks.

According to the previous implementations, it is not straightforward to evaluate a change to the data or to determine whether it is legitimate or malicious change from within the SEA. This is because the SEA lacks the rich semantic knowledge that is provided to the OS kernel.

Various embodiments of the present disclosure include an apparatus and method for protecting the data of an OS kernel running on an electronic device (e.g., a computing system thereof) from malicious attacks.

Storing Critical Data in a Secure Partition

According to various embodiments of the present disclosure, the OS data structures may be partitioned into a secure partition and a non-secure partition. The partitioning of OS data structures into the secure partition and the non-secure partition may be performed on critical OS data structures.

According to various embodiments of the present disclosure, the data in the secure partition can be only be modified if the SEA inspects the modification and performs an evaluation as to whether it is legitimate or malicious.

Although the present disclosure may describe the various embodiments for protecting OS kernels, various embodiments of the present disclosure are not limited thereto, and may apply to other data types that may be protected, or for which security is desired.

Various embodiments of the present disclosure include an apparatus and method for providing lightweight, real-time integrity protection to OS kernel data structures from malicious modifications. For example, various embodiments of the present disclosure include an apparatus and method for protecting an OS kernel data structure from modifications that are not intended by the normal operating logic of the OS kernel.

According to various embodiments of the present disclosure, there are multiple techniques to logically store the data in the secure partition. In this context, the term "secure partition" denotes data that is stored in a partition that cannot be directly accessed or modified by an attacker that compromises the kernel. In one example, the SEA can use its control of the memory pages access permission so that the data of the secure partition is stored in a special page, or multiple pages that are not accessible by the other partition. In that particular example, it is assumed that the SEA controls the paging access permission of the OS kernel virtual memory so that the OS kernel does not have a way to access or modify the data in the secure partition except after the permission of the SEA. In another example, the data may be completely removed from the OS kernel and stored in the secure partition. In all cases, all methods of protection incorporate that for the OS kernel to access or modify the data; it needs to request that from the SEA.

According to various embodiments of the present disclosure, in order to ensure integrity of and to protect the OS kernel data, the OS kernel data is stored such that the OS kernel itself is unable to modify its own data. As an example, the virtual memory range in which the OS kernel data is stored is mapped as read-only in the OS page tables. In addition, the SEA may ensure that the OS kernel data is not mapped (e.g., never mapped) as writable to the OS kernel. In other words, the SEA may ensure that the virtual memory range in which the OS kernel data is stored is not mapped as a writable memory range.

Prevention of Double Mapping

Protections to the OS kernel data associated with mapping the virtual memory in which the OS kernel data is stored to read only may be circumvented by a process referred to as double mapping. For example, an attacker may circumvent the OS kernel data being stored in a read-only memory range by creating a writable mapping to the OS kernel data, and thereafter modifying the OS kernel data using the writable mapping.

According to various embodiments of the present disclosure, an SEA may maintain a reference as to which areas of the data structure are being used by or for the OS kernel data. For example, in order to protect against the vulnerabilities associated with double mapping, various embodiments of the present disclosure may expressly forbid the double mapping. According to various embodiments of the present disclosure, the SEA may keep a status of every physical page on the computing system. For example, the status of every physical page on the computing system may provide an indication as to whether a specific physical page is used for OS kernel data. Various embodiments of the present disclosure are not limited in relation to data structures used for managing indications as to whether a memory page is used for OS kernel data.

An OS kernel decides to dedicate a particular memory region, which can be compromised of one or more memory pages, to store its data. A virtual mapping may exist to map the memory pages comprising this region into one or more corresponding physical address. The mapping also enforces the access permission allowed to each memory page. A process of double mapping includes the use of one or more other virtual memory address mapped, in a different permission to the intended physical address, which may hold the kernel data. The second, or subsequent, mappings would have a different access permission that would allow an attacker or a malicious party to gain unauthorized access to this data. According to various embodiments of the present disclosure, in order to protect against or otherwise prevent double mapping to the physical address at which the OS kernel data is stored, the SEA or other reference monitor maintains a mapping of physical address. For example, the SEA or the other reference monitor may maintain a mapping of all physical memory used for OS kernel data. If the OS kernel data requires memory, then the OS kernel data may locate (e.g., find) a physical memory location and will assign a slab to itself (e.g., referred to as slab allocation). Thereafter, the OS kernel may notify the SEA or other reference monitor of the assigned slab. For example, the OS kernel may notify the SEA that the assigned slab will be used by the OS kernel. In this way, the SEA is able to maintain an up-to-date mapping of physical addresses corresponding to physical memory used for OS kernel data.

As an example, according to various embodiments of the present disclosure, the data structure used may be a bitmap. According to such an example, whenever a physical page is allocated for OS kernel data, the SEA traps this event and sets the bit in the bitmap that corresponds to the physical page. For example, allocation of a physical page for OS kernel data may trigger an interrupt for the SEA to update the mapping of physical addresses corresponding to physical memory used for OS kernel data.

The bit set by the SEA may be cleared when the physical page is released (e.g., when the corresponding physical addresses are no longer used or required by the OS kernel). Because the SEA is responsible for integrity protection of the page tables for the OS kernel, the SEA may check (e.g., or confirm) any updates to the corresponding page tables. Accordingly, the SEA's verification logic in relation to the page tables may include a check for the value of the bitmap. The SEA may determine whether an update to a page table corresponds to an update to a page table mapped to OS kernel data (e.g., the SEA may determine whether an update or write to a page table corresponds to an attempt to modify the access permission associated with the physical memory used for OS kernel data). The SEA may determine whether a new virtual memory is mapped to a physical memory already being used for the OS kernel data.

According to such logic, if the SEA determines that a new entry (e.g., update) to the page table maps a physical page that is already marked (e.g., allocated) for OS kernel data, then the SEA may identify (e.g., report) such a mapping as a double mapping. Thereafter, if the mapping is identified as a double mapping, an appropriate handler may be invoked by the security policy. For example, the SEA may invoke a handler in response to an identification of a double mapping.

Protecting Selective Kernel Data and Using Virtual Pages for Protection

As mentioned above in the subsection titled "Storing Critical Data In A Secure Partition," various embodiments of this application rely on storing one or more of the critical OS kernel data types (or data structures) at the secure world. In this context, the term "secure partition" denotes data that is stored in a partition that cannot be directly accessed or modified by an attacker that compromises the kernel. One way to store kernel data in the secure partition is that the OS kernel data may be stored in a virtual memory range mapped as read-only. Although the above-identified method for protecting the OS may provide real-time protection, the above-identified method generally does not scale because they involve a request from the OS kernel to the SEA, which is presumably the only entity that has control over the secure partition and hence the only entity that can modify the data existing in that partition, to modifying critical kernel data structures. As a result, scalability is difficult. For example, protecting a large number of data structures would be cumbersome because each of the critical kernel data structures must be modified through a request to the SEA. Those requests incorporate a switch from the non-secure to the secure world and those requests are usually expensive from the performance perspective. In addition, the kernel code which interfaces with the modified data structures must also be modified. Consequently, porting the kernel code across different versions of the same OS is difficult (e.g., updating the OS to a new version is difficult).

As a result, even legal write operations (e.g., writes needed or otherwise permissible by the legal operating logic of the OS kernel) may not be allowed. According to various embodiments of the present disclosure, the SEA may allow rights to the OS kernel data by trapping (e.g., interrupting) write attempts to the OS kernel data. For example, the SEA may explicitly or implicitly trap writes to the OS kernel data. As an example, if the SEA is implemented using virtualization support from hardware, an explicit trap can be a Virtual Machine (VM) call by the protected OS kernel. An example of an implicit trap of a write to the OS kernel data may be a page fault exception that is re-routed to the SEA. According to various embodiments of the present disclosure, after trapping the write attempt, the SEA may validate the write attempt according to a predefined security policy. According to various embodiments of the present disclosure, the security policy can also optionally define the action to be taken when an illegal write attempt is detected. For example, the security policy may indicate that a warning is issued or execution of the computing system is terminated when an illegal write attempt is detected Protect the Data that Define Process Credentials from Malicious Modifications According to various embodiments of the present disclosure, one example of the approach is to protect the data structures that define the privilege level or running processes by placing them in the secure partition and control access and modifications of this data throughout the SEA. An example of this type of data structures is the "struct cred" used in Linux. This type of structures decides which processes can gain administrative or root privileges in the system. The techniques presented in this application include protecting any other data structure, such as any data structure that defines security critical system properties.

Once the SEA controls access to the data structure that defines the privilege level of processes running in the system. It needs a method to decide if an update to this data structure is legitimate or otherwise malicious. According to various embodiments of the present disclosure, an apparatus and method for providing protection to OS kernel data the data structures that define the privilege level may maintain a whitelist of programs that are allowed to gain administrator privilege in the system. For example, the programs on the whitelist may be allowed to gain administrator privilege when the programs on the whitelist are owned by a specific set of trusted users. According to various embodiments of the present disclosure, the whitelist of programs that are allowed to gain administrator privilege may prevent an attacker from further damaging a computing system or environment. For example, even if the attacker has compromised the computing system, the attacker may be prevented from further damaging the computing system because only programs on the whitelist may gain administrator privilege. Generally, normal operation of an electronic device such as a smartphone, does not require a user thereof to perform administrator tasks in the corresponding computing system. For example, only a small set of services and daemons with specific functionalities may require the administrator privilege.

According to various embodiments of the present disclosure, an SEA may be used to determine whether a change to a protected memory area that defines the privilege level of the running processes is allowed by the whitelist policy. For example, according to various embodiments of the present disclosure, the SEA may provide protection to the memory areas at which the OS kernel maintains the privilege information of the running processes on the system. According to various embodiments of the present disclosure, the SEA mediates any write attempts to the protected memory area (e.g., to ensure that the write attempt is allowed in accordance with the applicable whitelist policy).

According to various embodiments of the present disclosure, the SEA can determine if the running process belongs to the whitelist using various techniques, such as pre calculating the SHA-1 sum of the code base (e.g., "Code image" or simply "image") processes that belong to the whitelist and store the result in the secure partition. When the kernel requests to modify the privilege data to escalate the privilege of a process, the SEA can dynamically calculate the SHA-1 of the code or image of the running process and compare it against the white list to see if it is included or not.

According to various embodiments of the present disclosure, when the SEA interrupts a write to a physical address, the application attempting the write may identify the group to which the application belongs using one of the methods in the above paragraph. For example, the application may identify the privilege group to which the application belongs. A privilege group may correspond to a group of applications having similar write privileges. In response to receiving identification from the application attempting the write (e.g., identification of the privilege group, identification of the application, and/or the like), the SEA may compare such information to a mapping of privileges to groups, and thereafter determine whether to allow the application to complete the write. For example, the SEA may compare the information with the memory location to which the write is being attempted, and the privileges required for writing to such a memory location. If the memory location to which the write is being attempted requires a high privilege, then the SEA may compare information about application or task attempting the write with a white list. If the SEA determines that the application or task attempting the write is included in the white list, then the SEA may permit the write. Using this method, the SEA can determine if either the OS kernel itself or one of the privileged applications is attempting to modify the sensitive protected data, or it is another unprivileged application. This information is used to make the decision if the write will be allowed or not.

According to various embodiments of the present disclosure, when the SEA interrupts a write, for example by the OS kernel, to a physical address that represents credential defining data, the SEA may identify the application (identified by a user process) that will have a change in its privilege level as a result of this write operation using one of the methods in paragraph above. In response to receiving identification from the application affected by the privilege level change (e.g., identification of the privilege group, identification of the application, and/or the like), the SEA may compare such information to a mapping of privileges to groups, and thereafter determine whether to allow the write to be completed or not. For example, the application may not be included in the whitelist of applications that are allowed administrative privileges. As another example, the SEA may compare the information with the memory location to which the write is being attempted. Such technique can effectively stop attacks that compromise or subvert the OS security modules responsible for this verification by double checking the write operation from the SEA side. In other words, this technique can be summarized in the following sequence: The write to the credential defining data is attempted, the SEA intercepts it to determine which application is affected, then it refers to the whitelist to decide if the write will be allowed or not.

Validating Integrity of Data Structures Using Additional Elements

Protecting the OS kernel data structures from modifications that are not intended by the normal operating logic of the OS kernel.

A threat facing the approach introduced above is the fact that not all OS kernel data structures can be protected by the SEA. In other words, there must be a technique to prevent an adversary to subvert this protection by modifying one or more of the data structures that exist in the non-secure, or the normal, partition. An approach used with this technique includes a back pointer that links the data structures in the protected partition with other data that is important to system operation but stays outside the protected partition for some technical reason, such as system performance. One method would be having an additional pointer to the owner of the protected data structure in the secure partition within the data structure itself. In the case of task credentials, we can have pointer to the data structure that defines the task which has been created, such as the "struct task_struct" in Linux. Alternatively, a pointer to the base of a first level page table that defines the process memory map may be used. In this case, it may be assumed that the page tables are protected by the SEA, as discussed above. Hence, a pointer from the protected credential data to the page tables would be a one-to-one mapping between two protected parts of the system. Indeed, the page tables can be used to securely measure the executables running in the referenced process (e.g., using SHA-1 hash). Indeed, both pointers (to the page tables and to the task definition data structure) can be used simultaneously. Any kind of modifications of these pointers should be regulated by the SEA and strictly monitored for policy violations.

According to various embodiments of the present disclosure, the SEA is modified to add a check so that, upon executing a memory write for any of the protected sensitive data, it verifies whether these pointers, explained above, match to the expected value. For example, if the memory write would raise the privilege of an application or a running process, the SEA verifies that the pointers in the protected memory in the secure partitions point to the current task and current base of a first level page descriptor of a process that exist in the white list. When there is a mismatch, appropriate action should be taken to protect system security.

There is always a chance of an intruder creating a duplicate copy of a data structure and using it in place of the original data structure. The intruder may even fill valid values for various back pointers in order to deceive the SEA. In order to prevent such attacks, one has to mandate that these data structures should always come from a special area of protected memory. That is, the intruder must not be able to directly modify this special memory. For example, the intruder must be prevented from passing a random data structure to the protected secure partition. One can use object alignment, size of object for validation. One can alternatively use relationship between different members of the object or type of individual members to validate the object. It is also disallowed from making any random data read only so that it does not subvert the secure checks in the SEA or on the kernel side. These data structures should only be able to be modified/created by the SEA in a controlled fashion. In order to mandate this rule, an additional rule may be added in the SEA to determine whether the data structure came from the specific area. Any data structure which is outside the special area violates the policy and some action should be taken to protect system integrity. Once data structures are freed, always poison the page with random values so that, freed objects in the protected areas are not reused.

According to various embodiments of the present disclosure, the OS kernel will ultimately be the final consumer of the protected data. Hence, it has to have a secure method to differentiate between legitimate data protected by the SEA and another potentially malicious data that could be faked by an adversary to resemble the protected data. Such method required that the OS kernel NOT rely on any of its local unprotected data because once an adversary exploits the kernel, its unprotected data (i.e., data not in the SEA secure partition) should not be trusted. An example of this proposed method will be further explained below.

Using Particular Granularity of the Protected Data

Because various embodiments of the present disclosure are based on page permissions defined by a page table, the protection granularity of such various embodiments of the present disclosure may be the size of a page frame. For example, a page frame is typically 4096 bytes in size. If OS kernel data is scattered over virtual memory, the SEA may have difficulty determining whether a write attempt to a protected page is targeted for OS kernel data. In addition, such a memory layout may prove to be cumbersome if the SEA merely protects select types of OS kernel data structures. As a result, for ease of implementation, various embodiments of the present disclosure may aggregate OS kernel data (or other protected data) of the same type into the same set of pages. The set of pages may be, for example, a contiguous block, or slab, of pages.

Memory for OS kernel data may be allocated in a structured fashion. For example, the Linux kernel uses the slab allocator, which allocates memory for the same type of OS kernel data from only a set of contiguous physical page frames that are reserved for that data type (e.g., the set of page frames is often referred to as a slab).

FIG. 1 illustrates a memory allocation for Operating System (OS) kernel data.

Referring to FIG. 1, a memory includes one or more slab cache 101. Each slab cache 101 contains one or more page 103 and each page 103 holds one or more object. In the example of FIG. 1, the objects are illustrated as inode objects 105 and Cred objects 107. In implementation, each page 103 holds objects (e.g., 105, 107) of the same size and same type. A benefit of this type of memory is that pages 103 can be dynamically added or removed to increase or decrease the size of the slab cache 101. However, there may be internal fragmentation within a page 103 if the sizes of the objects (e.g., 105, 107) do not align with the size of the page.

Various embodiments of the present disclosure may leverage such a structured memory allocation scheme. For example, according to various embodiments of the present disclosure, the status of the physical memory may be updated whenever a new set of physical pages are reserved and/or released for OS kernel data (or other protected data) of a particular type. According to various embodiments of the present disclosure, the status of the physical memory may be updated in the SEA whenever a new set of physical pages are reserved and/or released for OS kernel data of a particular type. As a result, the SEA may quickly determine whether a physical page includes OS kernel data. In addition, the SEA may optionally selectively protect only a subset of OS kernel data types.

As an example, one approach is to protect the data structure that defines the privilege of the current process. In various implementations of this embodiment, the OS kernel is modified so that this data will be allocated for its own reserved memory that is defined as read-only. The kernel is only allowed to reserve memory for this data structure from that read-only defined memory. An example of this data structure in Linux is struct cred. In other various implementations of this embodiment, the OS kernel is modified so that once a space for the data to be protected is reserved, the kernel notifies the SEA to make this data read-only.

Guarantee that the Data Protected is the Data Actually in Use

Figure 2:
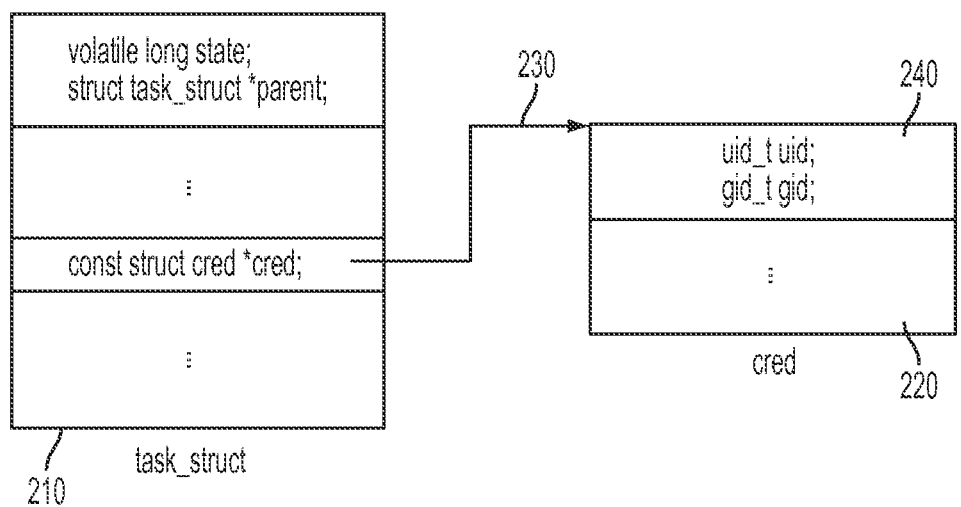
FIG. 2 illustrates a relationship between a Process Control Block (PCB) and structure for maintaining privilege levels on Linux OS according to various embodiments of the present disclosure.

As an example of the data that is protected, "struct cred" defines the privilege of processes in Linux. FIG. 2 illustrates a relationship between the Linux Process Control Block (PCB) and structure for maintaining privilege levels ("struct cred").

An OS may include a PCB. The PCB is a data structure that monitors (e.g., keeps track of) per-process states such as the execution context, owner, and Process ID (PID). In addition, the PCB may store a privilege level of the corresponding process.

Referring to FIG. 2, in contrast to the above-described PCB structure, a PCB 210 (e.g., the task_struct in Linux) may not include information relating to the privilege level of the running process. Rather, a separate structure 220 (e.g., referred to as cred, which is an abbreviation of credentials) may store the privilege level of the running process. Such PCB (e.g., the task_struct) may use a pointer 230 to point to the credential thereof.

As illustrated in FIG. 2, the entry for 'const struct cred' in the task_struct 210 points to the corresponding entry in the cred structure 220. The uid and gid values 240 in the cred structure define the privilege level of the running application (or user process) associated with that task_struct. For example, a uid value of 0 allows the application or process to gain root (Administrative) privilege of the system.

An OS using the PCB described in FIG. 2 (e.g., Linux) may forbid an arbitrary value to be written into any of the various ID fields of the cred structure 220. However, for example, if an attacker is able to write an arbitrary value into an ID field, then the attacker would have access to modify a privilege level (e.g., so as to elevate the attacker's own privilege level, as necessary). For example, an attacker may attempt to modify the cred structure 220 to modify the privilege of malicious programs, applications, processes, and/or the like by modifying the uid and the gid values 240. Accordingly, an attacker with unconstrained access to the memory for the OS kernel data may write to the cred structure 220 for a specific program, application, process, and/or the like in order to obtain root privileges for that specific program, application, process, and/or the like.

According to various embodiments of the present disclosure, an apparatus and method may include a partition for the cred structure 220 and a partition for other types of OS kernel data. In other words, the apparatus and method may be store the privilege information (e.g., the cred structure) for programs, applications, processes, and/or the like in a memory area that is different from the memory area in which other types of OS kernel data is stored. The privilege information (e.g., the cred structure) may be stored in a memory area that is non-contiguous with the memory area storing other type so OS kernel data.

As mentioned previously, the OS kernel needs to be able to confirm that the data comes from the protected section before it is used or consumed (i.e., before the kernel takes decisions that change the system state based on the values of this data). According to various embodiments of this disclosure, this can be achieved if the kernel runs this check without relying on any other data that could be malicious.

FIGS. 3A-3D illustrate an example of securely checking for the validity of protected data from the OS kernel without relying on non-protected data memory allocation for Operating System (OS) kernel data according to various embodiments of the present disclosure.

Referring to FIG. 3A, the data of the secure partition can be stored at a fixed address read-only section of the running OS. Such section can be created by modifying the loader file of the kernel 301 so that it includes a particular read only section called ro 307. Please note some irrelevant code is removed from the example at 305. The result of this change to the OS kernel will be reflected in FIG. 3B which shows an object dump of the generated kernel binary file (the code blob that actually executed on the system). The object dump clearly shows the newly created ro section 311 and the fixed memory address that it assigned to it.

As illustrated in FIG. 3C, the kernel can check if the object to be used is stored within the boundaries of the partition. The start of the ro section 321 and the end 323 are the same exported variables as defined in FIG. 3A 307. The final result of this method will be the binary instructions shown in FIG. 3D (which are obtained by dissembling the example code. In those instructions the OS kernel does compare the address of the protected data structure denoted by "addr" with the start address of the ro area 321 and the end address 323, which are the same symbols defined in 307. The result of this method is shown in the disassembly of the generated code in FIG. 3D. In this disassembly of the generated code, the generated "is_ro_data( )" 331 compares the input it gets with a fixed hard coded address that start at offsets 0x100 and 0x10c as in 333 and 337. In case the comparison fails, the function will jump to the failure condition as in 335 and 339. Of importance is that the values to compare against 343 are hard coded in the read-only test section, which can be easily protected by the SEA as a part of the OS kernel code protection. The values to compare against 343 match the hard coded section addresses shown in 311. Hence, the kernel does not rely on any data (e.g., such as a static and global variable) to reach to the affirmative conclusion that the data used actually belongs to the RO section.

Instead of a static approach of reserving a chunk of memory, an alternative approach is to dynamically add memory to a protected memory area. In this approach, a secondary protected data structure, such as a bit array where each bit stores status of pages in the protected memory, can be used. Whenever a page is added, it should be marked as protected in the bit array. In the same way when a page is removed, it should be marked as unprotected in the bit array. All access to bit array should be strictly controlled to prevent malicious modifications. This bit array may be protected by the SEA so that it cannot be directly modified if the OS kernel is compromised. However, an attacker can try to make an initialized page that is protected. In order to prevent this, one needs to poison a page before making it as protected.

According to various embodiments of this disclosure the approach in FIG. 3 can be further extended so that the RO data is stored in any place inside the kernel, while the RO section 311 as defined by 307 can host an index array where each entry represents a corresponding physical memory frame (e.g., memory page) inside the system. According to that extension, the function in FIG. 3C would be further modified to check if the index in that RO array that corresponds to the memory page at the passed parameter "addr"

is actually protected or not. The array in this case may be protected by the SEA so that it cannot be modified if the OS kernel is compromised According to various embodiments of the present disclosure, a back pointer field may be introduced into the cred structure 320.

Figure 4:
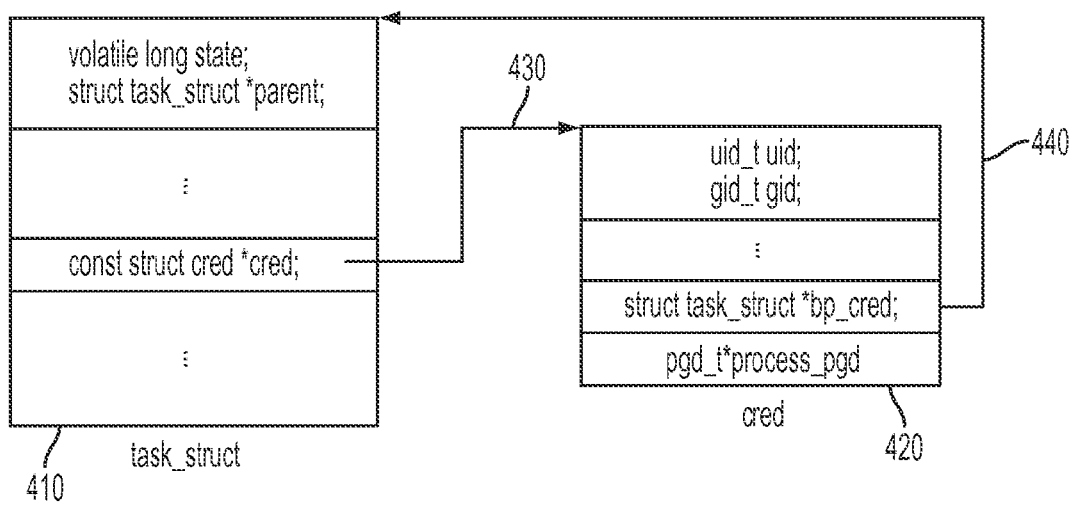
FIG. 4 illustrates a relationship between a PCB and a structure for maintaining privilege levels according to various embodiments of the present disclosure.

FIG. 4 illustrates a relationship between a PCB and a structure for maintaining privilege levels according to various embodiments of the present disclosure.

Although the present disclosure may refer to a PCB or a task_struct as examples, the present disclosure is not limited thereto and other types of programs, applications, processes, and/or the like that monitors process states may also be used.

Referring to FIG. 4, the task_struct (e.g., PCB) 410 includes a pointer field so as to use a pointer 430 to point to a corresponding area of the cred structure 420 which stores privilege information on the specific process. The cred structure 420 may be write protected by the SEA (e.g., the SEA mediates writes to the cred structure 420). According to various embodiments of the present disclosure, the cred structure 420 may include a pointer field so as to use a back pointer 440 to point to the task_struct 410. The setting on the back pointer on the CRED side is subject to strict security checks before being updated by the SEA. The value of the pointer on the task_struct side will be verified by the OS kernel side struct policies before the CRED value is used for any operation. The two back pointers must point to each other for the CRED struct to be valid. Moreover, the pointer to the page tables defining the particular application corresponding to this application can be checked through verifying the value of the variable process_pgd 420 against the page tables that define that application.

According to various embodiments of the present disclosure, the back pointer and the process_pgd 420 may be controlled by the SEA. For example, because the cred structure 420 is mapped to a read-only area of the OS kernel, the SEA controls the back pointer 440. The SEA may use the back pointer 440 as part of the credentials of a process when the OS kernel makes access control decisions.

According to various embodiments of the present disclosure, if the back pointer 440 does not check out (e.g., if the back pointer value does not match the task_struct address of the process attempting to make access), then access (e.g., write access to the cred structure 420) may be denied. For example, the SEA may analyze the back pointer associated with the process to determine whether the back pointer matches the task_struct of the process attempting to make access. Based on the analysis of the back pointer, the SEA may determine whether to permit access. The same method can be used to ensure that the process_pgd 440 points to a process that is allowed to get the requested privileged level defined by the CRED struct 440.

How to Detect if a Modification to Credential Data is Legitimate: A White List as an Example of Permitting Access As discussed above, various embodiments of the present disclosure may include an apparatus and method for providing protection to OS kernel data may maintain a whitelist of programs, applications, processes, and/or the like that are allowed to gain administrator privilege. For example, the SEA may maintain a whitelist of programs, applications, processes, and/or the like that are allowed to write to or otherwise modify OS kernel data.

According to various embodiments of the present disclosure, the whitelist of programs may be implemented. The whitelist may identify, for example, a list of programs, applications or processes that may be run with administrator privileges. The present disclosure may describe the various embodiments by using a whitelist as an example. However, the present disclosure is not limited thereto and other methods or schemes for controlling access to data (e.g., read and/or write to data) may be used. For example, instead of or in addition to a whitelist, a black list identifying a list of programs, applications or processes that may not access data may also be used.

Because a process is a runtime representation of programs stored on permanent storage such as NAND flash, hard drive, and/or the like, the SEA may keep track of the relationship between a process and the program binary that the process executes. According to various embodiments of the present disclosure, the SEA may keep track of the relationship between the process and the corresponding program binary by, for example, instrumenting the part of OS kernel that handles system calls (e.g., execve( ), or the like) to invoke the SEA so that the SEA can update this information in the SEA internal data structure. Accordingly, the SEA may maintain a record of the relationship between a process and a program binary corresponding thereto. Another example is to monitor page table modification and whenever a new set of page tables is created, the SEA can use one of various mechanisms such as calculating the SHA-1 checksum of the code parts of the new process, to determine what type of privilege should be associated with that process. The page tables can be identified by their highest level (e.g., the level 1 page table) and a pointer of which can be stored in the credential data structure by the SEA side.

As an example of the way by which the SEA may keep track of the relationship between the process and the corresponding program binary, one may choose to extend the SEA so that the SEA maintains a mapping that records the state of each running process in the system. Each process may be identified, for example by its corresponding level 1 page table, and the mapping maintained by the SEA can be used to mark the state of one or more running processes in relation to whether the running process is allowed to run with administrator privileges or not or whether they are on a whitelist or a black list regarding gaining this administrator privilege.

Another example, the do_execve( ) function (e.g., which handles the execve( ) system call) of the Linux kernel can be instrumented to call the SEA with the path to the program binary that the do_execve( ) function is about to execute. In response, the SEA can then mark the state of the corresponding level 1 page table in the bitmap, according to the given whitelist policy.

According to various embodiments of the present disclosure, for processes that do not invoke the execve( ) system call, such as a web server, which forks a child process per incoming connection, the SEA may enforce the rule that the allowed privilege states of the forked processes are inherited from the parent(s) of the forked process. For example, the SEA may enforce the rule that the allowed privilege state of the forked processes inherit that states of the parent(s) of the forked process may be implemented by instrumenting the Linux kernel's do_fork( ) function.

To elaborate on the method introduced above, the SEA may link all the input it has from intercepting critical kernel calls (such as do_execve( ) and do_fork( )) along with the information it can obtain from monitoring the page tables of the OS kernel or either one of those so that it can determine if a particular process belongs to the whitelist or the blacklist maintained by the SEA or either of them. The particular process can be identified by the page tables associated with this process, in a system that assigns a new set of page tables for each new process such as the Linux kernel. Once this identification is done, the SEA might use a backpointer in the credential data structure to point to this identification data. Whenever the SEA requests a request to modify the credential data, it might reference this backpointer to verify that it indeed points to a process, which could be identifiable by the page tables, with the appropriate credentials. For example, the administrative privilege is only allowed to processes that belong to the whitelist or to those that does not belong to the blacklist.

How the Enforcement is Done? and when are the Kernel-Side Changes Made?

According to various embodiments of the present disclosure, the OS kernel control paths that update, for example, the cred field of the task_struct 410 may be instrumented to invoke the SEA to do the update. The SEA updates the back pointer 420 in the cred object whose address is being assigned to the pointer in task_struct 410 along with other fields requested by the OS kernel. For example, in a Linux kernel, four functions may be modified for this purpose: (1) commit_creds( ), for changing the current process's credentials; (2) copy_creds( ), for new process creation via do_fork( ); (3) override_creds( ) for temporarily overriding the current process's credentials; and (4) revert_creds( ), for temporarily overriding the current process's credentials.

According to various embodiments of the present disclosure, the SEA may be responsible for checking if (e.g., determining whether) the affected process is allowed to have the new set of credentials (e.g., if the fields to be updated of the credential defining structure will have proper values). If the SEA determines that the affected process is allowed to have the new set of credentials, then the back pointer 420 may be updated to the correct value. If the SEA determines that the affected process is not allowed to have the new set of credentials, then the back pointer 420 may be cleared so that the process will not be able to perform any security-sensitive tasks. Accordingly, the SEA may control which processes are allowed to have escalated privileges (e.g. administrative privilege) in the system.

According to various embodiments of the present disclosure, the OS kernel itself may be modified to enforce the check of the back pointer 420 before the credential defining data structure (or any other protected data structure) is used (i.e., before it takes effect on the system behavior). According to various embodiments of the present disclosure, the OS kernel may be modified to enforce the check of the back pointer 420 by leveraging, for example, the Linux Security Module (LSM) to perform the check of the back pointer. The LSM is a set of standard hooks placed along the OS kernel control paths whenever a security-sensitive operation is to be performed. The LSM may be used as basis for security frameworks such as SELinux and AppArmor.

According to various embodiments of the present disclosure, the back pointer checking logic may be added to the default operations of the LSM hooks. For example, the back pointer checking logic may include logic according to which if back pointer does not check out (e.g., if the back pointer 420 value does not match the task_struct 410 address of the process attempting to make access), then access is denied.

According to various embodiments of the present disclosure, the LSM hooks may additionally check if (e.g., determine whether), for example, the cred structure 420 is within the range of protected memory. Otherwise, if the cred structure 420 is not within the range of protected memory, then the attacker may circumvent the protections to the OS kernel data by creating a cred structure 420 with the desired privileges and assign the cred structure 420 to the cred pointer 430 in task_struct. The method of verifying if the cred structure (or any other protected structure) is not within the protected memory can be made secure against data attacks using the methods described in this disclosure (such as the one in FIGS. 3A-3D).

According to various embodiments of the present disclosure, the SEA may be invoked explicitly, implicitly, or a combination thereof.

According to various embodiments of the present disclosure, the protections to the OS kernel data are scalable (e.g., applicable to other types of data and/or data structures). Data (e.g., OS kernel objects) may be aggregated into a set of slabs (e.g., contiguous pages), and the pages that make up the slabs may be write-protected (e.g., mapped as read-only). For example, according to various embodiments of the present disclosure, the same technique may be used to protect the integrity of, for example, task_struct 410, so that carrying out pointer redirection attacks is not possible.

Figure 5:
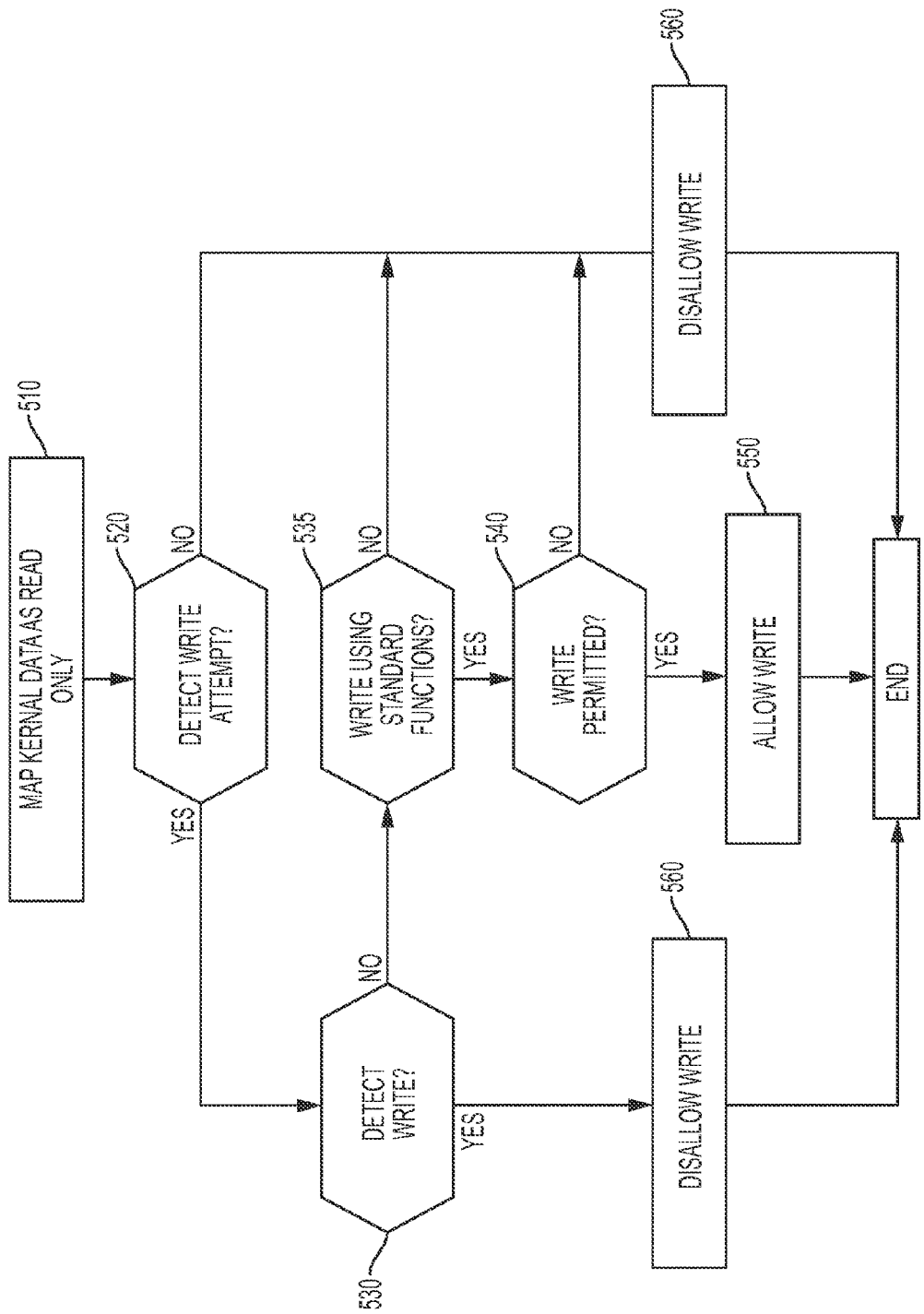
FIG. 5 illustrates a flowchart of a method of protecting kernel data using additional elements within the data itself according to various embodiments of the present disclosure.

In some embodiments, a data structure such as task_struct 410, may be updated more frequently as compared to another data structure (e.g., cred structure 420). For example, for a Linux kernel, a cred structure 420, once assigned to the pointer 430 in task_struct 410, may not be modified, or may be modified less frequently than the task_struct structure 410. In such cases, protecting the cred structure 420 (e.g., the less modified data structure), along with the enforcement of the cred back pointer 440, various embodiments of the present disclosure are able to achieve the same level of security while reducing overhead caused by memory protection. An example of the implementation of the runtime enforcement presented in this invention FIG. 5 illustrates a flowchart of a method of protecting kernel data using additional elements within the data itself according to various embodiments of the present disclosure.

At operation 510, OS kernel data is mapped to a read-only memory area. For example, the OS kernel data is stored in a virtual memory range mapped as read-only. According to various embodiments of the present disclosure, the area in which privileges are stored (e.g., cred structure) may be allocated to a contiguous memory area. For example, the cred structure may be allocated to memory corresponding to a set of contiguous physical page frames (e.g., a slab). For example, according to various embodiments of the present disclosure, the cred structure is mapped to a slab that is separate from other OS kernel data structures. Mapping of slabs may be monitored to determine whether a slab is mapped to a specific type of data structure such as the cred structure or other types of data structures for which protection is desired. The monitoring may be performed, for example, by using a bitmap. For example, when a slab is mapped to the cred structure, a bit corresponding to the slab may be set to "1" indicating the cred structure is mapped to the slab. The monitoring may be performed, for example, by an SEA. Other monitoring schemes may also be used. Other OS kernel data structures may be stored in at least one other slab. According to various embodiments of the present disclosure, the cred_struct may be pointed to via a pointer field of another data structure (e.g., task_struct). According to various embodiments of the present disclosure, the cred structure may also include a pointer field so as to use a back pointer to point to task_struct.

At operation 520, a write attempt may be detected. For example, an SEA may detect or otherwise be informed of a write attempt to the cred_struct. If the write attempt is not detected at operation 520, the write is disallowed at operation 560 and the process ends.

On the other hand, if the write attempt is detected at operation 520, then, at operation 530, a determination may be made as to whether a writing is detected.

If determination is made that the write is detected at operation 530, then, at operation 535, a determination is made as to whether there is a write using standard functions. If there is not a write using standard functions, then, at operation 560, the write attempt may be disallowed. For example, if the SEA determines that the write attempt is not permitted (e.g., based on a white list policy, a black list policy, and/or the like), then the SEA may disallow the write attempt.

If determination is made at operation 530 that the write is detected, the write attempt is disallowed at operation 560 and the process ends.

If determination is made that there is a write using standard functions, a determination is made whether the write is permitted in operation 540. For example, the SEA may determine whether the detected write attempt is in accordance with a whitelist policy. For example, the SEA may store or otherwise have reference to a whitelist which provides a list of programs or processes that are allowed to write to the OS kernel data. If it is determined that the write is permitted in operation 540, the write is allowed in operation 550 and the process ends. On the other hand, if it determined in operation 540 that the write is not permitted, the write is disallowed in operation 560 and the process ends.

If determination is made that the entity attempting the write is authentic at operation 540, then, at operation 560, the write attempt may be allowed. For example, if the SEA determines that the entity (e.g., the process) attempting the write is authentic, then the SEA may allow the write attempt. The SEA may determine the authenticity of the entity (e.g., the process) by confirming that the entity attempting the write corresponds to the entity associated with the privilege credential being used for the write attempt. The SEA may confirm that the entity attempting the write corresponds to the entity associated with the privilege credential being used for the write attempt by confirming that the address of the entity attempting the write corresponds to the address of the entity associated with the privilege credential being used for the write attempt.

According to various embodiments of the present disclosure, operations 530 and operations 540 may be performed in any order, may be performed in parallel, or only one of the operations 530 or 540 may be performed.

Figure 6:
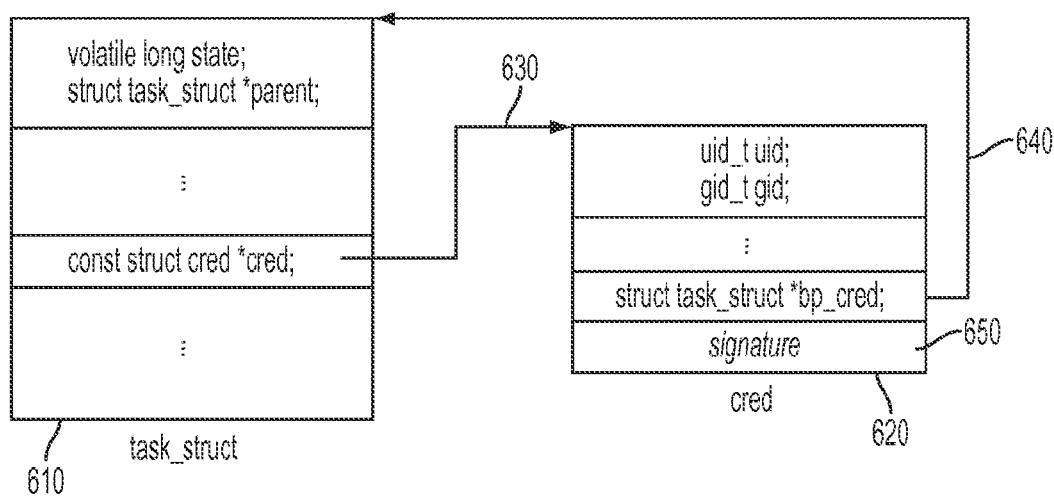
FIG. 6 illustrates a relationship between a PCB and a structure for maintaining privilege levels according to various embodiments of the present disclosure.

FIG. 6 illustrates a relationship between a PCB and a structure for maintaining privilege levels according to various embodiments of the present disclosure.

Referring to FIG. 6, various embodiments of the present disclosure include an apparatus and method for providing protection to OS kernel data structures from malicious modifications using cryptography.

According to various embodiments of the present disclosure, the protection to the OS kernel data may use cryptographic signatures rather than write-protecting the virtual memory area of critical OS kernel data structures.

As a result, various embodiments of the present disclosure may provide protection to the OS kernel data without concern as to how OS kernel objects are allocated. For example, various embodiments of the present disclosure may provide integrity protection even if the OS kernel objects are scattered throughout the OS kernel address space.

According to various embodiments of the present disclosure, the cryptographic signature may be computed, for example, using a public/private key pair. The public key may be embedded into the OS kernel, and the private key will be stored in a secure memory that is under control of the SEA and out of reach from the OS kernel. For example, as illustrated in FIG. 6, according to various embodiments of the present disclosure, an additional field 650 in the cred structure 620 may be configured to hold (e.g., store) the computed signature (e.g., signed by the private key). According to various embodiments of the present disclosure, the cred structure 620 includes a back pointer 640 which points back to the task_struct 610. Similar to the structure illustrated in FIG. 4, the task_struct 610 includes a pointer field so as to use a pointer 630 to point to a corresponding area of the cred structure 620 which stores privilege information on the specific process.

According to various embodiments of the present disclosure, for example, a set of functions in Linux kernel that modifies the cred structure (e.g., commit_creds( ), copy_creds( ), override_creds( )/revert_creds( )), may be instrumented to invoke the SEA. According to various embodiments of the present disclosure, the SEA may verify whether the modification is legal (e.g., under a whitelist policy, a blacklist policy, and/or the like) and either sets or breaks the back pointer. According to various embodiments of the present disclosure, the signature may be computed only for credentials with a valid back pointer.

According to various embodiments of the present disclosure, the LSM may be used to check the validity of the back pointer. According to various embodiments of the present disclosure, the OS kernel may verify the cred signature when the back pointer checks out (e.g., the pointer of the cred structure 640 points to the task_struct 610 which points to the cred structure 620).

According to various embodiments of the present disclosure, the SEA may be invoked explicitly, implicitly, or a combination thereof.

According to various embodiments of the present disclosure, the SEA provides code integrity, thereby ensuring the safety of instrumented OS kernel code. In addition, according to various embodiments of the present disclosure, the signature protected fields in the cred structure are trusted.

According to various embodiments of the present disclosure, the CRED structure can hold a counter that holds the depth of the running process for the first process invoked by the kernel (e.g., the init process in Linux). For example, the cred struct for the first process would hold depth value 0. If it invokes another process (e.g., through execve( ) or fork( )) then they will hold depth value 1 and so on. In some embodiments of the present disclosure, the depth value can be used to replace the whitelist (or used together) if the SEA can determine a cutoff depth value (e.g., a threshold) after which the running processes are not allowed to invoke any more privileged (e.g., administrative or root) processes or application. In this method, if one of the processes with the cut off depth value is compromised, it will not be able to invoke a malicious process with escalated privileges. For example, if the cutoff is set to 1 then only the first kernel process will be allowed to invoke administrative application. This method is useful because as the depth increase the number of processes with the same depth increase and the chances of them being compromised by a malicious attacker may increase as well.

In some operating systems, they may not use fork and exec model for creating all processes. They may use fork and bind method instead. Some operating systems may use both. In fork and bind method, one forks a new process which shares address space with parent, but instead of overwriting its memory map by calling exec, it reads object files of new app into its address space and simply jumps execution start of new binary. In such circumstances one cannot use depth as a parameter. But, fortunately, the parent of the process which spawns such kind of processes would drop the privilege before spawning the applications. In such cases, a whitelist of all the processes which can legally elevate its privileges is maintained and all other processes are disallowed to increase its privilege Alternatively, a blacklist can be maintained of processes which are unique ancestors of processes, to which users have direct access. For example, Process X is a privilege process, which forks and reduces its privilege before executing a user process. Then there is a high chance that a hacker can directly attach such processes in order to increase its privilege. Since credential structures are placed in the protected area, the attacker may not be able to manipulate it directly. Rather, the attacker will be forced to use an existing helper function to achieve privilege escalation. Now, these helper functions can be changed such that, whenever privilege escalation happens, it needs to match against parents of processes in the blacklist. If found, privilege escalation should be simply disallowed.

According to various embodiments of the present disclosure, for processes that do not invoke the execve( ) system call, such as a web server, which forks a child process per incoming connection, the SEA may enforce the rule that the bitmap states of the forked processes are inherited from the parent(s) of the forked process. For example, the SEA may enforce the rule that the bitmap states of the forked processes inherit the bitmap states of the parent(s) of the forked process may be implemented by instrumenting the Linux kernel's do_fork( ) function.

Similar to the OS kernel data integrity approach, the protection of the OS kernel data using cryptographic signatures may be generalized to other types of OS kernel data as well. According to various embodiments of the present disclosure the cryptographic signature may be used indicate whether the OS kernel data structure has been maliciously modified.

As discussed above there may be a small number of functions (e.g., four functions) in the Linux kernel that assign the cred pointer to task_struct. Thus, according to various embodiments of the present disclosure, the OS kernel (e.g., the Linux kernel) may be modified such that only creds that have been assigned to task_structs are write-protected. This may be done by creating a separate (and protected) slab cache for such creds. According to various embodiments of the present disclosure, the functions may be implemented so that the functions invoke the SEA when a new cred is to be assigned to task_struct (as before). The SEA may check the whitelist policy and additionally copy the contents of the new cred to another cred that is allocated from the protected slab, and assign the other cred to task_struct instead.

Figure 7:
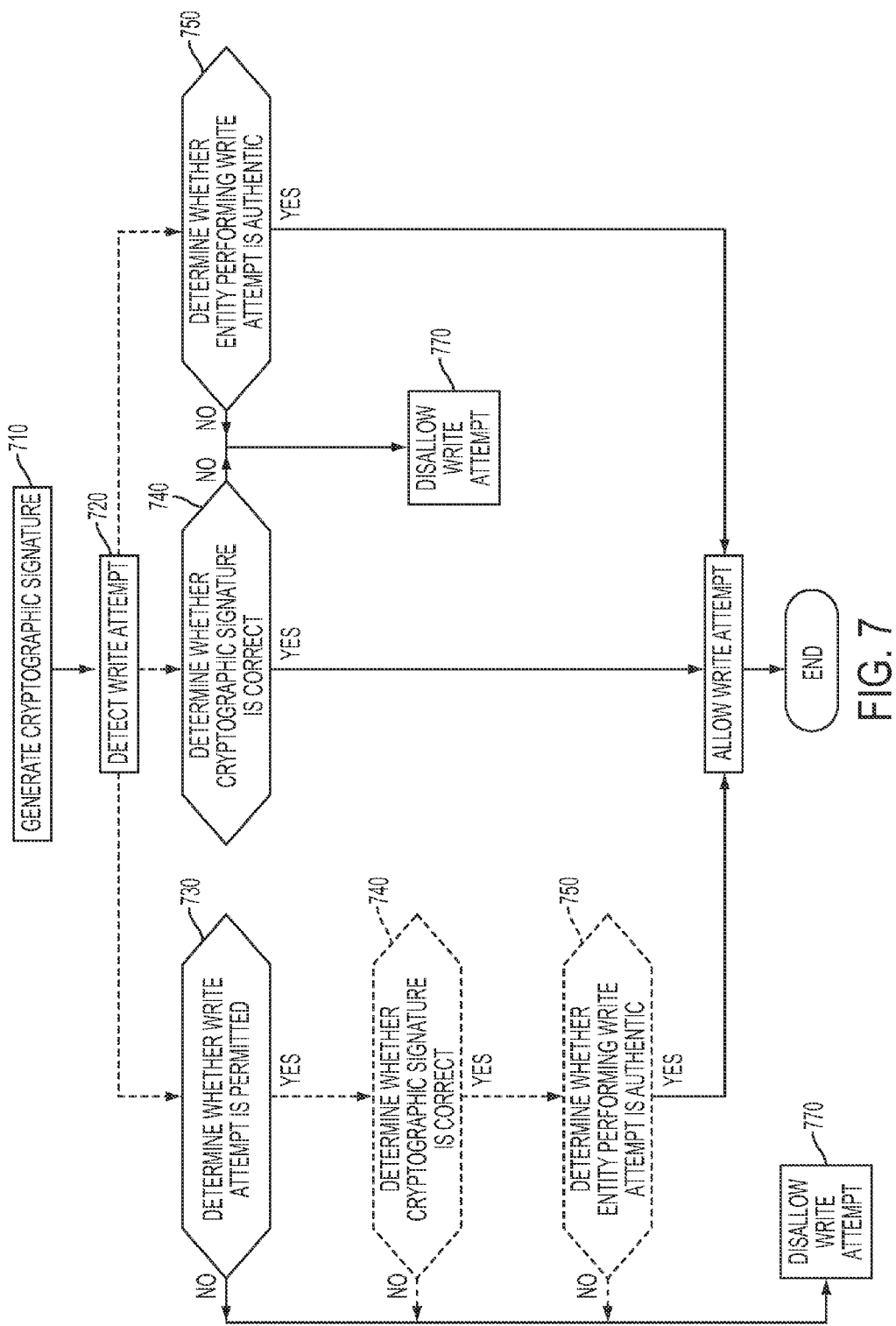
FIG. 7 illustrates a flowchart of a method of protecting kernel data integrity using cryptography according to various embodiments of the present disclosure.

FIG. 7 illustrates a flowchart of a method of protecting OS kernel data integrity using cryptography according to various embodiments of the present disclosure.
Using Cryptography Referring to FIG. 7, at operation 710, a cryptographic signature is generated. For example, the cryptographic signature may be computed using a public/private key pair. The public key may be embedded into the OS kernel. The private key may be stored in secure memory that is under control of, for example, a SEA and out of reach from the OS kernel. According to various embodiments of the present disclosure, the SEA may generate the cryptographic signature.

At operation 720, a write attempt may be detected. For example, an SEA may detect or otherwise be informed of a write attempt to OS kernel data (e.g., to the cred_struct). A program, application, process, and/or the like attempting the write may communicate (or otherwise include a reference to) a cryptographic signature associated therewith. For example, the program, application, process, and/or the like may communicate (e.g., to the SEA) the cryptographic signature associated therewith when the program, application, process, and/or the like attempts the write. As another example, the program, application, process, and/or the like may communicate (e.g., to the SEA) the cryptographic signature associated therewith in response to a request from the SEA.

At operation 730, determination may be made as to whether the write attempt is permitted. For example, the SEA may determine whether the detected write attempt is in accordance with a whitelist policy, a blacklist policy, and/or the like. For example, the SEA may store or otherwise have reference to a whitelist which provides a list of programs or processes that are allowed to write to the OS kernel data. As another example, the SEA may store or otherwise have reference to a blacklist which provides a list of programs or processes that are not allowed to write to the OS kernel data.

If determination is made that the write attempt is not permitted at operation 730, then, at operation 770, the write attempt may be disallowed (e.g., the SEA may proceed to operation 770 at which the SEA disallows the write attempt). For example, if the SEA determines that the write attempt is not permitted, then the SEA may disallow the write attempt.

If determination is made that the write attempt is permitted (e.g., if the SEA determines that the write attempt is in accordance with the whitelist policy) at operation 730, then at operation 770, the write attempt is allowed. For example, if the SEA determines that the write attempt is permitted, then the SEA may allow the write attempt.

In addition to, or as alternative to operation 730, a determination may be made at operation 740 as to whether the cryptographic signature is correct. For example, the SEA may compare the private key and the public key to determine whether the cryptographic signature is not correct.

If determination is made (e.g. if the SEA determines) that the detected the cryptographic signature is not correct at operation 740, then, at operation 770, the write attempt may be disallowed (e.g., the SEA may proceed to operation 770 at which the SEA disallows the write attempt).

If determination is (e.g., if the SEA determines) that the detected the cryptographic signature is correct at operation 740, then, at operation 760, the write attempt is allowed.

In addition to, or alternative to operations 730 and/or 740, at operation 750 a determination is made (e.g., the SEA determines) whether the entity (e.g., program or process) attempting to write is authentic. For example, the SEA may confirm that a back pointer from the cred structure points to the corresponding task_struct associated with the entity attempting to write to the cred structure (e.g., OS kernel data).

If determination is made (e.g., if the SEA determines) that the entity attempting to write is not authentic at operation 750, then, at operation 770, the write attempt may be disallowed (e.g., the SEA may proceed to operation 770 at which the SEA disallows the write attempt).

If determination is made (e.g., if the SEA determines) that the entity attempting to write is authentic at operation 750, then the write attempt is allowed (e.g., the SEA may proceed to operation 760 at which the SEA allows the write attempt).

Figure 8:
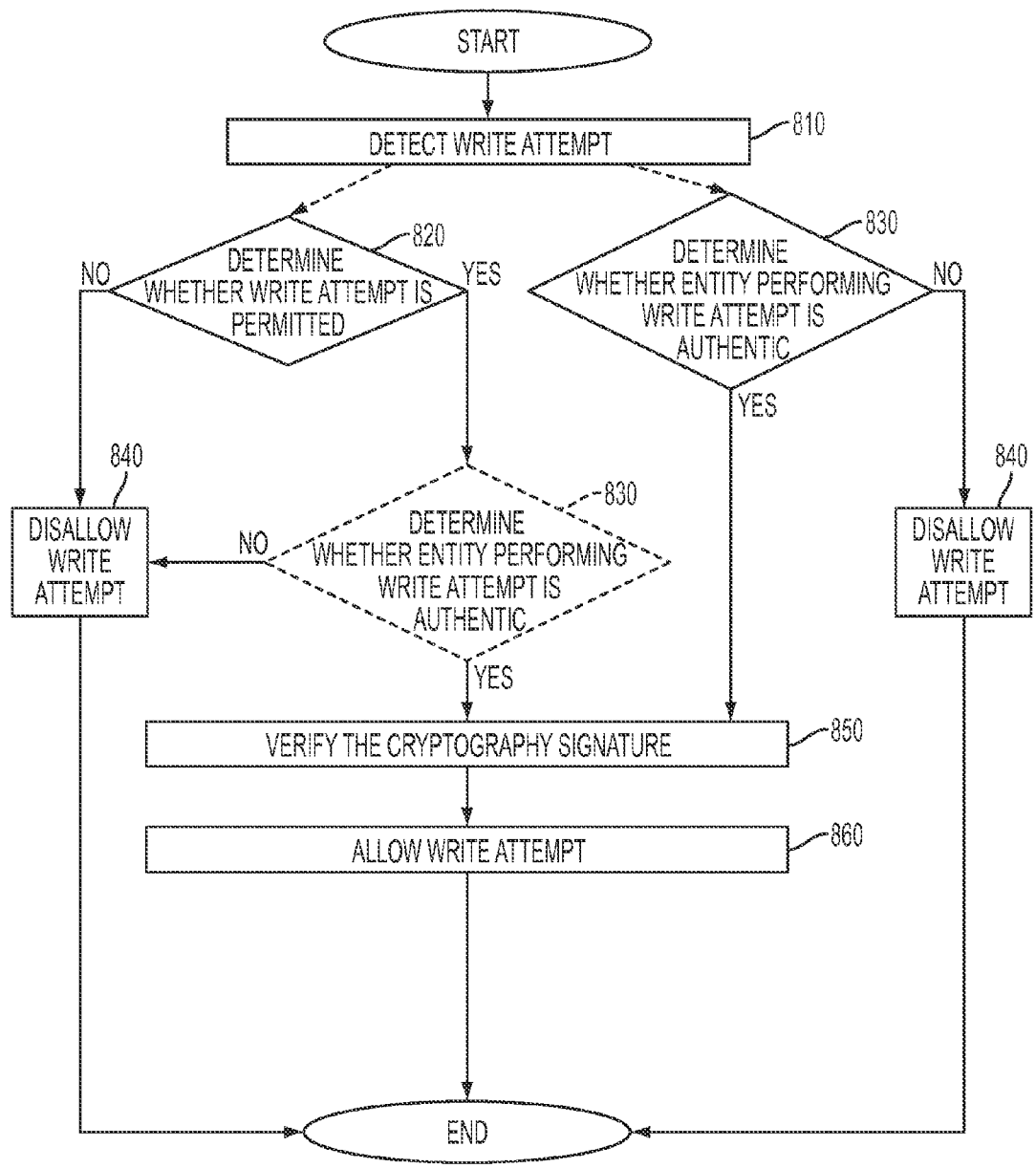
FIG. 8 illustrates a flowchart of a method of protecting kernel data integrity using cryptography according to various embodiments of the present disclosure.

FIG. 8 illustrates a flowchart of a method of protecting OS kernel data integrity using cryptography according to various embodiments of the present disclosure.

Referring to FIG. 8, at operation 810 a write attempt is detected. The electronic device may detect that a write attempt is being made to update data stored in a secure area of the electronic device. The SEA of the electronic device may be informed of the write attempt to the secure area. The write attempt may be a write attempt to update or otherwise modify information regarding a privilege of a program, application, process, and/or the like to update OS kernel data.

Thereafter, as illustrated in FIG. 8, the electronic device may proceed to operation 820 or operation 830. The dotted arrows denote optional paths by which an electronic device according to various embodiments of the present disclosure may proceed.

According to various embodiments of the present disclosure, the electronic device may proceed to operation 820 at which the electronic device may determine whether the write attempt is permitted. For example, the SEA of the electronic device may determine whether the write attempt is permitted. The SEA may determine whether the specific program, application, process, and/or the like attempting to write (e.g., to update or otherwise modify the OS kernel data or the privileges to do so) is permitted to carry out such a write task. For example, the SEA may determine whether the specific program, application, process, and/or the like attempting to write has the requisite privilege to carry out such a write task. The SEA determine whether the write attempt is permitted using a whitelist policy, a blacklist policy, and/or the like.

If the electronic device determines that the write attempt is not permitted at operation 820, then electronic device may proceed to operation 840 at which the electronic device disallows the write attempt. For example, if the SEA determines that the specific program, application, process, and/or the like attempting the write (e.g., to update or otherwise modify the OS kernel data or the privileges to do so), then the SEA may disallow the write attempt.

In contrast, if the electronic device determines that the write attempt is permitted at operation 820, then the electronic device may proceed to operation 830 or operation 850. For example, according to various embodiments of the present disclosure, operation 830 may be optional.

At operation 830, the electronic device may determine whether the entity (e.g., the program, application, process, and/or the like) attempting the write is authentic. The SEA may determine the authenticity of the entity (e.g., the process) by confirming that the entity attempting the write corresponds to the entity associated with the privilege credential being used for the write attempt. The SEA may confirm that the entity attempting the write corresponds to the entity associated with the privilege credential being used for the write attempt by confirming that the address of the entity attempting the write corresponds to the address of the entity associated with the privilege credential being used for the write attempt.

If the electronic device determines that the entity attempting the write is not authentic at operation 830, then the electronic device may proceed to operation 840 at which the electronic device disallows the write attempt. For example, if the SEA determines that the entity attempting the write does not correspond to the entity associated with the privilege credential being used for the write attempt, then the SEA may disallow the write attempt.

In contrast, if the electronic device determines that the entity attempting the write is authentic at operation 830, then the electronic device may proceed to operation 850 at which the electronic device may verify the cryptography signature. For example, if the SEA determines that the entity attempting the write corresponds to the entity associated with the privilege credential being used for the write attempt, then the SEA may compute the signature. The SEA may determine that the entity attempting the write corresponds to the entity associated with the privilege credential being used for the write attempt by confirming that the back pointer stored that is associated with the privilege credential and that is stored in the secure area points to the address of the entity attempting the write.

Thereafter, at operation 860, the electronic device may allow the write attempt.

Figure 9:
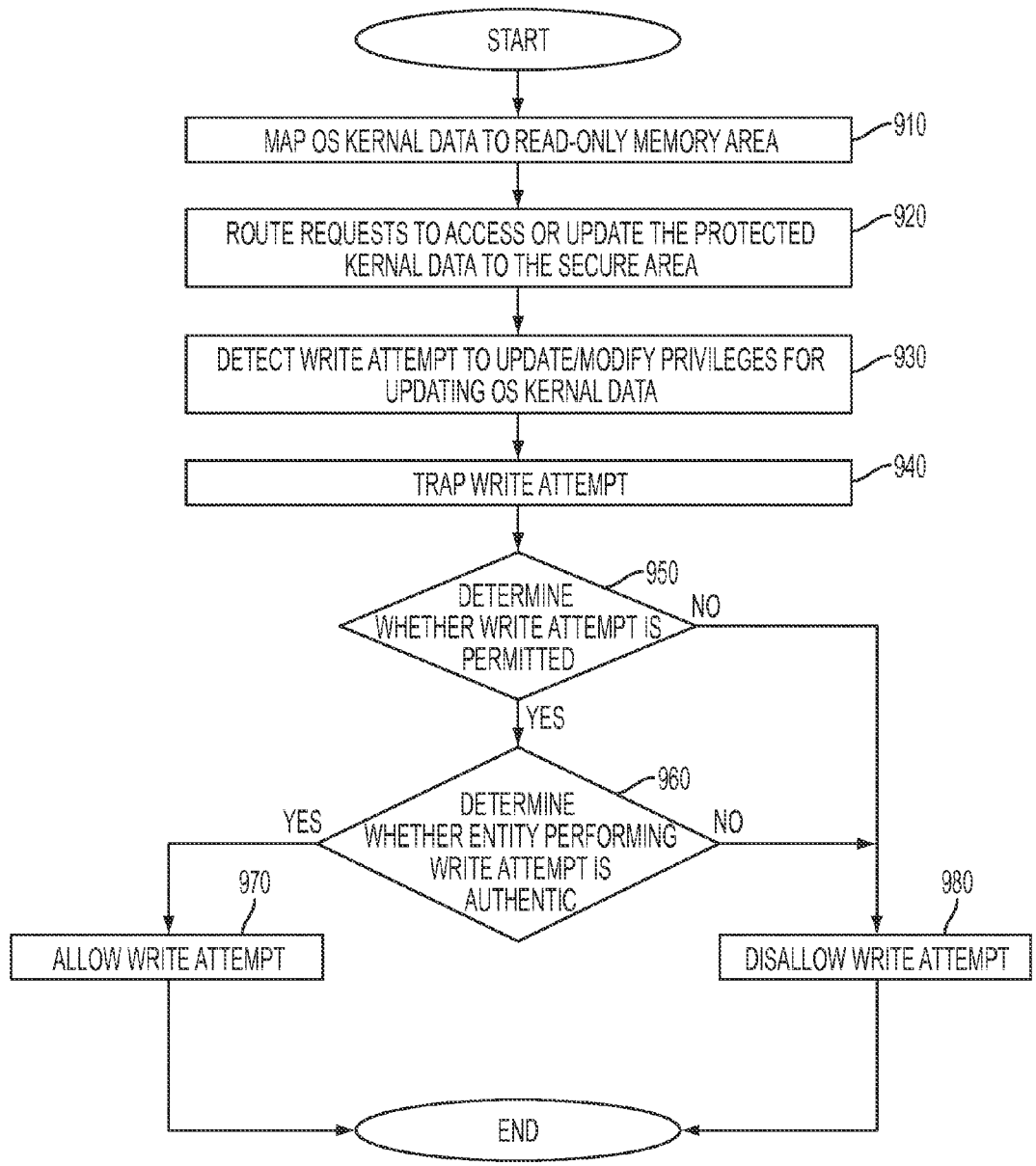
FIG. 9 illustrates a flowchart of a method of protecting kernel data integrity according to various embodiments of the present disclosure.

FIG. 9 illustrates a flowchart of a method of protecting kernel data integrity according to various embodiments of the present disclosure.

At operation 910, an electronic device may map OS kernel data to a read-only memory area of the electronic device. The OS kernel data may be stored in a secure memory area of the electronic device.

At operation 920, the electronic device maps privilege information for updating OS kernel data to a secure memory area of the electronic device. According to various embodiments of the present disclosure, the integrity of the secure area may be software guaranteed. According to various embodiments of the present disclosure, the integrity of the secure area may be hardware guaranteed. According to various embodiments of the present disclosure, the privilege information for updating OS kernel data may be information relating to programs, applications, processes, and/or the like that may gain administrator privilege. According to various embodiments of the present disclosure, the privilege information for updating OS kernel data may be information relating to programs, applications, processes, and/or the like that may write to, update, or otherwise modify information that is stored in the read-only memory area of the electronic device). For example, the privilege information for updating OS kernel data may be information providing an identifier of programs, applications, processes, and/or the like that may modify the privilege information in the secure memory area, that may write to, update, or otherwise modify OS kernel data (e.g., that is stored in the secure memory area), and/or the like.

At operation 930, the electronic device may detect a write attempt for updating/modifying the information that is stored in the secure memory area. For example, the electronic device may detect an attempt by a program, application, process, and/or the like to write, update, or otherwise modify the privilege information (e.g., privileges for updating/modifying OS kernel data, privileges for writing to or otherwise modifying information in the secure memory area, and/or the like).

At operation 940, the electronic device traps the detected write attempt. For example, in response to detecting the write attempt, the SEA may interrupt the write attempt (e.g., in order to mediate the write attempt).

Thereafter, the electronic device proceeds to operation 950 at which the electronic device determines whether the write attempt is permitted. For example, the SEA may determine whether the program, application, process, and/or the like attempting the write is authorized to make the write. The program, application, process, and/or the like attempting the write may communicate or otherwise make available the privilege associated therewith. For example, the program, application, process, and/or the like attempting the write may communicate privilege information to the SEA in response to the SEA prompting for such information. The privilege information communicated to the SEA may identify a privilege group within which the program, application, process, and/or the like attempting the write belongs. The SEA may confirm the privilege information received from the program, application, process, and/or the like attempting the write with privilege information that is associated with the program, application, process, and/or the like attempting the write stored in the secure memory area.

If the electronic device determines that the write attempt is permitted at operation 950, then the electronic device may proceed to operation 960 at which the electronic device determines whether the entity performing the write attempt is authentic. For example, if the SEA determines that the program, application, process, and/or the like attempting the write has the appropriate privilege for making the write, then the SEA may determine whether the program, application, process, and/or the like attempting the write is authentic. The SEA may determine the authenticity of the entity (e.g., the process) by confirming that the entity attempting the write corresponds to the entity associated with the privilege credential being used for the write attempt. The SEA may confirm that the entity attempting the write corresponds to the entity associated with the privilege credential being used for the write attempt by confirming that the address of the entity attempting the write corresponds to the address of the entity associated with the privilege credential being used for the write attempt.

If the electronic device determines that the entity performing the write attempt is authentic at operation 960, then the electronic device may proceed to operation 970 at which the electronic device allows the write attempt. For example, if the SEA determines that the program, application, process, and/or the like attempting the write is authentic, then the SEA may allow the write attempt.

In contrast, if the electronic device determines that the entity performing the write attempt is not authentic at operation 960, then the electronic device may proceed to operation 980 at which the electronic device may disallow the write attempt. For example, if the SEA determines that the program, application, process, and/or the like attempting the write is not authentic, then the SEA may disallow the write attempt. The SEA may report the write attempt as a malicious event. For example, in response to determining that the program, application, process, and/or the like attempting the write is not authentic, the SEA may alert the user of the electronic device of the malicious event.

If the electronic device determines that the write attempt is not permitted at operation 950, then the electronic device may proceed to operation 980 at which the electronic device disallows the write attempt. For example, if the SEA determines that the program, application, process, and/or the like attempting the write does not have the appropriate privileges for the attempted write, then the SEA may disallow the write attempt. The SEA may report the write attempt as a malicious event. For example, in response to determining that the program, application, process, and/or the like attempting the write is not authentic, the SEA may alert the user of the electronic device of the malicious event.

Figure 10:
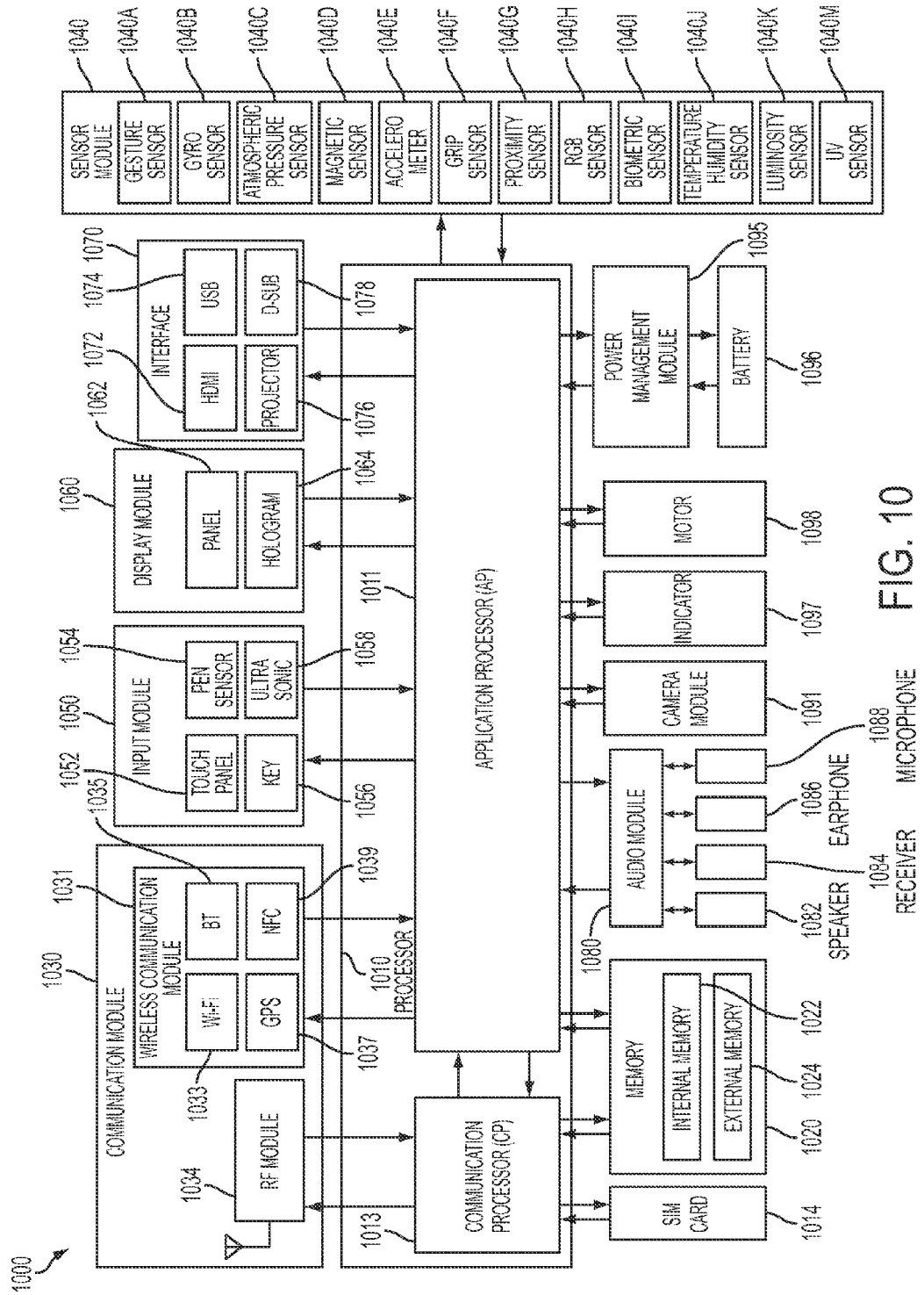
FIG. 10 illustrates a block diagram of hardware according to various embodiments of the present disclosure.

FIG. 10 illustrates a block diagram of hardware according to various embodiments of the present disclosure.

Referring to FIG. 10, hardware 1000 may be, for example, electronic device 200.

As illustrated in FIG. 8, the hardware 1000 may include one or more processors 1010, a Subscriber Identification Module ("SIM") card 1014, a memory 1020, a communication module 1030, a sensor module 1040, an input module 1050, a display module 1060, an interface 1070, an audio module 1080, a camera module 1091, a power management module 1095, a battery 1096, an indicator, 1097, a motor 1098, and/or the like.

The processor 1010 (e.g., processor 220) may include one or more application processors ("APs") 1011 or one or more communication processors ("CP's"). The processor 1010 may be, for example, processor 220. Although FIG. illustrates that the AP 1011 and the CP 1013 are included in processor 1010, according to various embodiments of the present disclosure, the AP 1011 and the CP 1013 may each be included in different Integrated Circuit ("IC") packages.

The AP 1011 may control one or more hardware or software components that are connected to AP 1011 or perform processing or computation of data (including multimedia data), by executing an OS or an application program ("app"). The AP 1011 may be implemented, for example, as a system-on-chip ("SoC"). The processor 1010 may further include a Graphics Processing Unit ("GPU"; not shown). The processor 1010 may include any combination of AP 1011, CP 1013, or the GPU.

The CP 1013 may manage data link associated with communication between an electronic device (e.g., electronic device 201) and one or more other electronic devices, and alter communication protocol. CP 1013 may be implemented, for example, as a SoC. According to various embodiments of the present disclosure, the CP 1013 may perform at least a portion of multimedia control functionality. The CP 1013 may, for example, identify and authenticate an electronic device within a communication network, using a SIM (e.g., the SIM card 1014). CP 1013 may also provide the user with, for example, voice call service, video call service, text messaging (e.g., Short Messaging Service ("SMS")) service, or packet data services.

According to various embodiments of the present disclosure, the AP 1011 or the CP 1013 may process instructions or data received from non-volatile memory by loading the instructions or data into volatile memory. In addition, the AP 1011 or the CP 1013 may store into the non-volatile memory data received from, or generated by, at least one of other components.

The SIM card 1014 may be a card implementing a SIM, and may be configured to be inserted into a slot disposed at a specified location of the electronic device. The SIM card 1014 may include a unique identifier (e.g., Integrated Circuit Card Identifier ("ICCID")) or subscriber information (e.g., International Mobile Subscriber Identity ("IMSI")).

The memory 1020 may include an internal memory 1020 and/or an external memory 1024. The memory 1020 may be, for example, the memory 230. The internal memory 1022 may be, for example, at least one of volatile memory (e.g., Dynamic RAM ("DRAM"), Static RAM ("SRAM") or Synchronous Dynamic RAM ("SDRAM")) or non-volatile memory (e.g., one time programmable ROM ("OTPROM"), Programmable ROM ("PROM"), Erasable and Programmable ROM ("EPROM"), Electrically Erasable and Programmable ROM ("EEPROM"), mask ROM, flash ROM, NAND flash memory or NOR flash memory). According to various embodiments of the present disclosure, the internal memory 1022 may be a Solid State Drive ("SSD"). The external memory 1024 may be, for example, a flash drive (e.g., Compact Flash ("CF drive"), Secure Digital ("SD"), micro Secure Digital ("micro-SD"), mini Secure Digital ("mini-SD"), extreme Digital ("xD"), Memory Stick, or the like).

The communication module 1030 may include wireless communication module 1031 and RF module 1034. The communication module 1030 may be, for example, the communication module 260. The wireless communication module 1031 may include, for example, a Wi-Fi module 1033, a Bluetooth module 1035, a GPS module 1037, and/or a Near-Field Communication ("NFC") module 1039. For example, the wireless communication module 1031 may provide wireless communication functionality using radio waves having various frequencies. Additionally or alternatively, the wireless communication module 1031 may include an interface (e.g., a LAN card) or a modem for connecting the hardware 1000 to one or more networks such as Internet, LAN, WAN, telecommunication network, cellular network, satellite network, or POTS.

The RF module 1034 may include data transmission and reception functionalities such as transmitting and receiving RF signals or requested electronic signals. Although not shown, the RF module 1034 may include a transceiver, a Power Amp Module ("PAM"), a frequency filter or a Low Noise Amplifier ("LNA"). In addition, the RF module 1034 may include one or more components for transmitting and receiving Electro-Magnetic ("EM") waves in the free space such as conductors or conductive wires.

The sensor module 1040 may include at least one of, for example, a gesture sensor 1040A, a gyro sensor 1040B, an atmospheric pressure sensor 1040C, a magnetic sensor 1040D, an accelerometer 1040E, a grip sensor 1040F, a proximity sensor 1040G, an RGB sensor 1040H, a biometric sensor 1040I, a temperature/humidity sensor 1040J, a luminosity sensor 1040K, an ultra violet ("UV") sensor 1040M, and the like. The sensor module 1040 may detect the operation state of the electronic device or measure physical properties and convert the detected or measured information into electrical signals. Additionally or alternatively, the sensor module 1040 may also include, for example, electrical-nose sensor (not shown), electromyography ("EMG") sensor (not shown), electroencephalogram ("EEG") sensor (not shown), or fingerprint sensor. The sensor module 1040 may also include control circuitry for controlling one or more sensors included therein.

The input module 1050 may include a touch panel 1052, (digital) pen sensor 1054, key 1056 or ultrasonic input device 1058. Input module 1050 may be, for example, input module 240. The touch panel 1052 may detect touch input using, for example, capacitive, resistive, infrared, ultrasonic methods, and/or the like. The touch panel 1052 may also include a touch panel controller (not shown). A capacitive-type touch panel may, for example, detect proximity inputs (e.g. hovering input) in addition to, or alternative to, touch inputs. The touch panel 1052 may also include a tactile layer. Haptic feedback may be provided to the user using the tactile layer.

The (digital) pen sensor 1054 may be implemented, for example, using methods identical to or similar to receiving a touch input from a user, or using a separate detection sheet (e.g., a digitizer). The key 1056 may be, for example, a keypad or a touch key. The ultrasonic input device 1058 may be a device configured to identify data by detecting, using a microphone (e.g., microphone 1088), ultrasonic signals generated by a pen. The ultrasonic input device 1058 may detect data wirelessly. According to various embodiments of the present disclosure, the hardware 1000 may receive user input from an external device (e.g., a network, computer or server) connected to the hardware 800 using the communication module 1030.

The display module 1060 may include the panel 1062 or the hologram 1064. The display module 1060 may be, for example, display module 250. The panel 1062 may be, for example, a Liquid-Crystal Display ("LCD") or an Active-Matrix Organic Light-Emitting Diode ("AM-OLED") display. The panel 1062 may be configured to be, for example, flexible, transparent, and/or wearable. The panel 1062 and the touch panel 1052 may be implemented as a single module. The hologram 1064 may utilize the interference of light waves to provide a three-dimensional image in empty space. According to various embodiments of the present disclosure, the display module 1060 may also include a control circuitry for controlling the panel 1062 or the hologram 1064.

The interface 1070 may include, for example, one or more interfaces for High-Definition Multimedia Interface ("HDMI") 1072, a Universal Serial Bus ("USB") 1074, a projector 1076 or a D-subminiature ("D-sub") 1078. Additionally or alternatively, the interface 1070 may include, for example, one or more interfaces for Secure Digital ("SD")/MultiMedia Card ("MMC") (not shown) or Infrared Data Association ("IrDA") (not shown).

The audio module 1080 may encode/decode voice into electrical signal, and vice versa. The audio module 1080 may, for example, encode/decode voice information that are input into, or output from, a speaker 1082, a receiver 1084, an earphone 1086, and/or a microphone 1088.

The camera module 1091 may capture still images or video. According to various embodiments of the present disclosure, the camera module 1091 may include one or more image sensors (e.g., front sensor module or rear sensor module; not shown), an Image Signal Processor ("ISP;" not shown), or a flash Light-Emitting Diode ("flash LED;" not shown).

The power management module 1095 may manage electrical power of the hardware 1000. Although not shown, the power management module 1095 may include, for example, a Power Management Integrated Circuit ("PMIC"), a charger Integrated Circuit ("charger IC"), a battery fuel gauge, and/or the like.

The PMIC, for example, may be disposed in an integrated circuit or an SoC semiconductor. The charging method for the hardware 1000 may include wired or wireless charging. The charger IC may charge a battery, or prevent excessive voltage or excessive current from a charger from entering the hardware 1000. According to various embodiments of the present disclosure, the charger IC may include at least one of a wired charger IC or a wireless charger IC. The wireless charger IC may be, for example, a magnetic resonance type, a magnetic induction type or an electromagnetic wave type, and may include circuits such as a coil loop, a resonance circuit or a rectifier.

The battery gauge may measure, for example, a charge level, a voltage while charging, a temperature of battery 1096, and/or the like. The battery 1096 may supply power to, for example, the hardware 1000. The battery 1096 may be, for example, a rechargeable battery.

The indicator 1097 may indicate one or more states (e.g., boot status, message status or charge status) of the hardware 1000 or a portion thereof (e.g., the AP 1011). The motor 1098 may convert electrical signal into mechanical vibration. An MCU (not shown) may control the sensor module 1040.

Although not shown, the hardware 800 may include one or more devices for supporting mobile television ("mobile TV;" e.g., a Graphics Processing Unit ("GPU")). The devices for supporting mobile TV support processing of media data compliant with, for example, Digital Multimedia Broadcasting ("DMB"), Digital Video Broadcasting ("DVB"), or media flow.

Although the disclosure has been shown and described with reference to various embodiments thereof, it will be understood by those skilled in the art that various changes in form and details may be made therein without departing from the spirit and scope of the disclosure as defined by the appended claims and their equivalents.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as a storage device like a Read Only Memory (ROM), whether erasable or rewritable or not, or in the form of memory such as Random Access Memory (RAM), memory chips, device or integrated circuits or on an optically or magnetically readable medium such as a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

Although the disclosure has been shown and described with reference to various embodiments thereof, it will be understood by those skilled in the art that various changes in form and details may be made therein without departing from the spirit and scope of the disclosure as defined by the appended claims and their equivalents.

According to various embodiments of the present disclosure, an apparatus and method for providing protection to OS kernel data may provide integrity protection to SELinux contexts (e.g., which may be used to control file and directory accesses, or make other access control decisions). As a result, writes are mediated to confirm that the attempted write has permission to perform such a task.

What is claimed is:

1. A method for protecting kernel data integrity in an electronic device, the method comprising:
    creating a secure partition by:
        storing the kernel data in a virtual memory range, and mapping the virtual memory range as read-only;
    generating a back pointer in the secure partition including a credential structure;
    detecting a write attempt to the kernel data;
    determining whether a process attempting to write to the kernel data is permitted according to a specified condition;
    determining whether an entity associated with the process requesting the write attempt is authentic by verifying that the back pointer provided in the secure partition of the kernel data points to the process existing in a task structure; and
    allowing the write attempt if the process attempting to write to the kernel data satisfies the specified condition and the entity associated with the process requesting the write attempt is authentic.

2. The method of claim 1, further comprising:
    disallowing the write attempt if the entity associated with requesting the write attempt is determined to be inauthentic.

3. The method of claim 1, wherein the determining of whether the entity associated with the process requesting the write attempt is authentic comprises:
    confirming that an address of the entity associated with the process requesting the write attempt matches an address stored in association with a corresponding credential received from the process requesting the write attempt.

4. The method of claim 1, further comprising:
    storing information relating to privileges of one or more of an entity and a process for updating the kernel data in a secure memory area.

5. The method of claim 4, wherein the determining of whether the process attempting to write to the kernel data is permitted comprises:
    determining whether an entity associated with the process attempting the write has a credential satisfying a privilege threshold required to make the write to the kernel data.

6. The method of claim 5, wherein the determining of whether the process attempting to write to the kernel data is permitted further comprises:
    determining, by a security enforcement agent (SEA) of the electronic device, whether the process attempting the write has an appropriate privilege to make the write to the kernel data.

7. The method of claim 1, wherein the mapping of the kernel data to the read-only memory area comprises:
    mapping a credential structure to a set of contiguous physical page frames; and
    mapping at least a subset of the kernel data to a set of contiguous physical page frames.

8. The method of claim 7, wherein the set of contiguous physical page frames to which the credential structure is mapped is discontinuous in relation to the set of contiguous physical page frames to which the at least the subset of the kernel data is mapped.

9. The method of claim 1, further comprising:
    disallowing the write attempt if the process attempting to write to the kernel data does not satisfy the specified condition.

10. An apparatus for protecting kernel data integrity in an electronic device, the apparatus comprising:
    a storage unit including a read-only memory area; and
    at least one processor configured to:
        create a secure partition by:
            storing the kernel data in a virtual memory range, and
            mapping the virtual memory range to a read-only memory area,
        generate a back pointer in the secure partition including a credential structure;
        detect a write attempt to the kernel data,
        determine whether a process attempting to write to the kernel data is permitted according to a specified condition,
        determine whether an entity associated with the process requesting the write attempt is authentic by verifying that the back pointer provided in the secure partition of the kernel data points to the process existing in a task structure; and allow the write attempt if the process attempting to write to the kernel data satisfies the specified condition and the entity associated with the process requesting the write attempt is authentic.

11. The apparatus of claim 10, wherein the at least one processor is further configured to disallow the write attempt if the entity associated with requesting the write attempt is determined to be inauthentic.

12. The apparatus of claim 10, wherein the at least one processor is further configured to confirm that an address of the entity associated with the process requesting the write attempt matches an address stored in association with a corresponding credential received from the process requesting the write attempt.

13. The apparatus of claim 10, wherein the at least one processor is further configured to store information relating to privileges of one or more of an entity and a process for updating the kernel data in a secure memory area of the storage unit.

14. The apparatus of claim 13, wherein the at least one processor is further configured to whether an entity associated with the process attempting the write has a credential satisfying a privilege threshold required to make the write to the kernel data.

15. The apparatus of claim 14, wherein the electronic device comprises a security enforcement agent (SEA) that is configured to determine whether the process attempting the write has an appropriate privilege to make the write to the kernel data.

16. The apparatus of claim 10, wherein the at least one processor is further configured to map a credential structure to a set of contiguous physical page frames of the storage unit, and to map at least a subset of the kernel data to a set of contiguous physical page frames of the storage unit.

17. The apparatus of claim 16, wherein the set of contiguous physical page frames of the storage unit to which the credential structure is mapped is discontinuous in relation to the set of contiguous physical page frames of the storage unit to which the at least the subset of the kernel data is mapped.

18. The apparatus of claim 10, wherein the at least one processor is further configured to disallow the write attempt if the process attempting to write to the kernel data does not satisfy the specified condition.

19. A method for protecting kernel data integrity in an electronic device, the method comprising:
storing a private key in a secure memory that is inaccessible to an operating system (OS) kernel;
embedding a public key in the kernel data of the OS kernel;
generating a cryptography signature based on the public key and private key pair;
configuring an additional field in the OS kernel;
storing the cryptography signature based on the public key and private key pair in the additional field;
detecting a write attempt to the kernel data;
determining whether a process attempting to write to the kernel data is permitted according to a specified condition; and
confirming that a cryptography signature associated with the write attempt is correct in relation to the generated cryptographic signature.

20. The method of claim 19, wherein the secure memory is under control of a security enforcement agent (SEA) responsible for protecting the kernel data integrity in the electronic device.

21. The method of claim 19, further comprising:
disallowing the write attempt if the process attempting to write to the kernel data is not permitted to write to the kernel data according to the specified condition.

22. The method of claim 19, further comprising:
disallowing the write attempt if the entity associated requesting the write attempt is determined to be inauthentic.

23. The method of claim 19, further comprising:
disallowing the write attempt if the cryptography signature associated with the write attempt is not correct in relation to the generated cryptographic signature.

24. An apparatus for protecting kernel data integrity in an electronic device, the apparatus comprising:
a memory including a read-only memory area; and
at least one processor configured to:
store a private key in a secure memory that is inaccessible to an operating system (OS) kernel,
embed a public key in the kernel data of the OS kernel,
generate a cryptography signature based on the public key and private key pair,
configure an additional field in the OS kernel,
store the cryptography signature based on the public key and private key pair in the additional field,
detect a write attempt to the kernel data,
determine whether a process attempting to write to the kernel data is permitted according to a specified condition, and
confirm that a cryptography signature associated with the write attempt is correct in relation to the generated cryptographic signature.

25. The apparatus of claim 24,
wherein the at least one processor is further configured to execute a security enforcement agent (SEA) that controls a secure memory area of the memory.

26. The apparatus of claim 24, wherein the at least one processor is further configured to disallow the write attempt if the process attempting to write to the kernel data is not permitted to write to the kernel data according to a specified condition.

27. The apparatus of claim 24, wherein the at least one processor is further configured to disallow the write attempt if the entity associated requesting the write attempt is determined to be inauthentic.

28. The apparatus of claim 24, wherein the at least one processor is further configured to disallow the write attempt if the cryptography signature associated with the write attempt is not correct in relation to the generated cryptographic signature.

* * * * *